Dec. 26, 1950     C. MARBLE     2,535,218
AUTOMATIC CHARGE ACCOUNTING SYSTEM
Filed Jan. 11, 1945     11 Sheets-Sheet 1
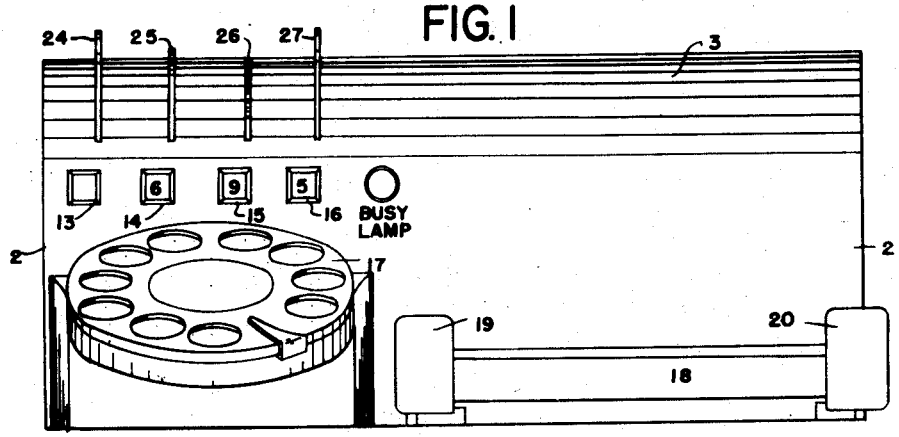
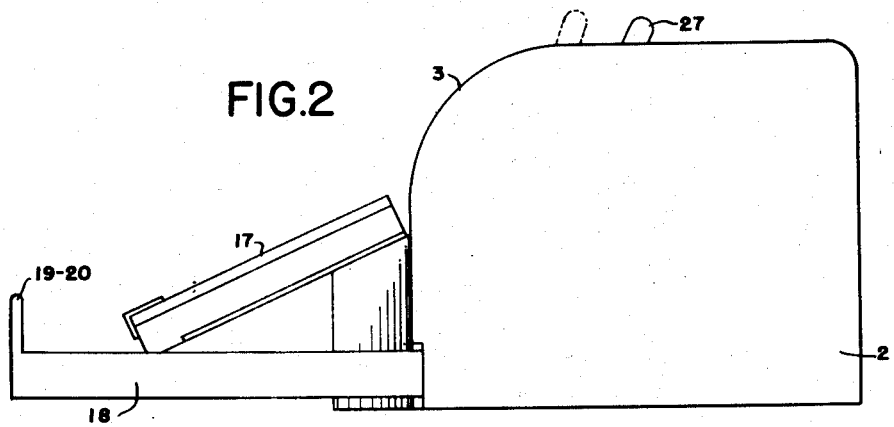
*INVENTOR.*
CLARENCE MARBLE
BY
ATTORNEY Dec. 26, 1950   C. MARBLE   2,535,218
AUTOMATIC CHARGE ACCOUNTING SYSTEM
Filed Jan. 11, 1945   11 Sheets-Sheet 2
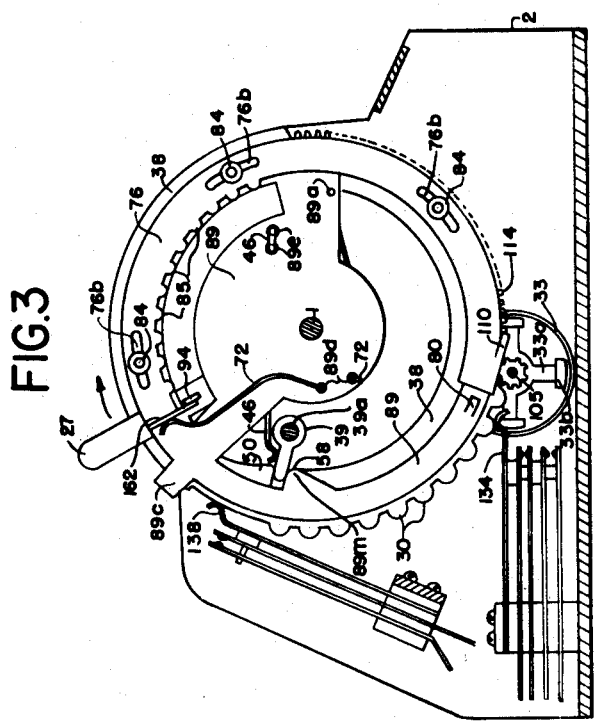
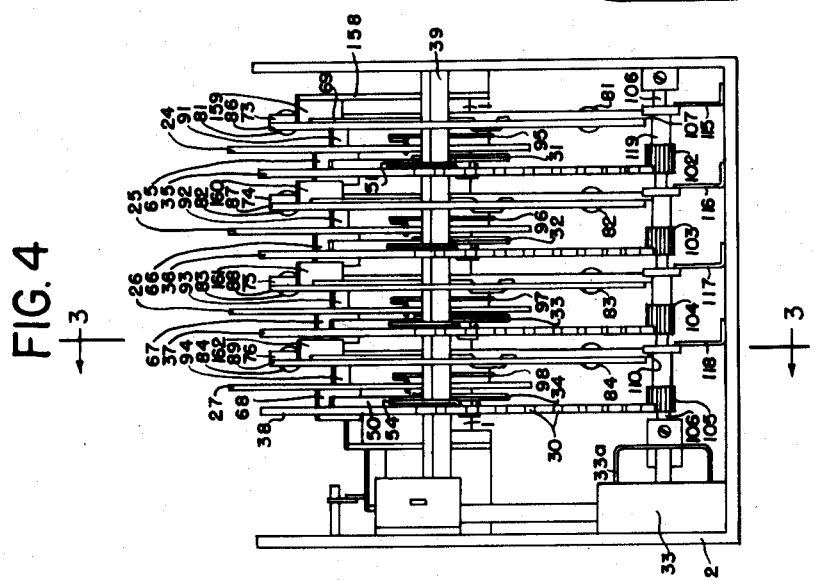
*INVENTOR.*
CLARENCE MARBLE
BY
ATTORNEY Dec. 26, 1950 C. MARBLE 2,535,218
AUTOMATIC CHARGE ACCOUNTING SYSTEM
Filed Jan. 11, 1945 11 Sheets-Sheet 3

INVENTOR.
CLARENCE MARBLE
BY
ATTORNEY

Dec. 26, 1950 — C. MARBLE — 2,535,218
AUTOMATIC CHARGE ACCOUNTING SYSTEM
Filed Jan. 11, 1945 — 11 Sheets-Sheet 5

| OPERATING PLATES | | | |
|---|---|---|---|
| $0.00 | $0.01 | $1.00 | $10.00 |
| 38 | 37 | 36 | 35 |
| 50 | 49 | 48 | 47 |
| 54 | 53 | 52 | 51 |
| 58 | 57 | 56 | 55 |
| 64 | 63 | 62 | 61 |
| 114 | 113 | 112 | 111 |
| 130 | 129 | 128 | 127 |

| KEYS OR LEVERS | | | |
|---|---|---|---|
| 27 | 26 | 25 | 24 |
| 34 | 33 | 32 | 31 |
| 68 | 67 | 66 | 65 |
| 94 | 93 | 92 | 91 |
| 98 | 97 | 96 | 95 |

| FIXED PLATES | | | |
|---|---|---|---|
| 89 | 88 | 87 | 85 |
| 80 | 79 | 78 | 77 |

| RESTORING PLATES | | | |
|---|---|---|---|
| 76 | 75 | 74 | 73 |
| 84 | 83 | 82 | 81 |
| 72 | 71 | 70 | 69 |
| 110 | 109 | 108 | 107 |
| 162 | 161 | 160 | 159 |

INVENTOR.
CLARENCE MARBLE
BY
ATTORNEY

Dec. 26, 1950   C. MARBLE   2,535,218
AUTOMATIC CHARGE ACCOUNTING SYSTEM
Filed Jan. 11, 1945   11 Sheets-Sheet 6
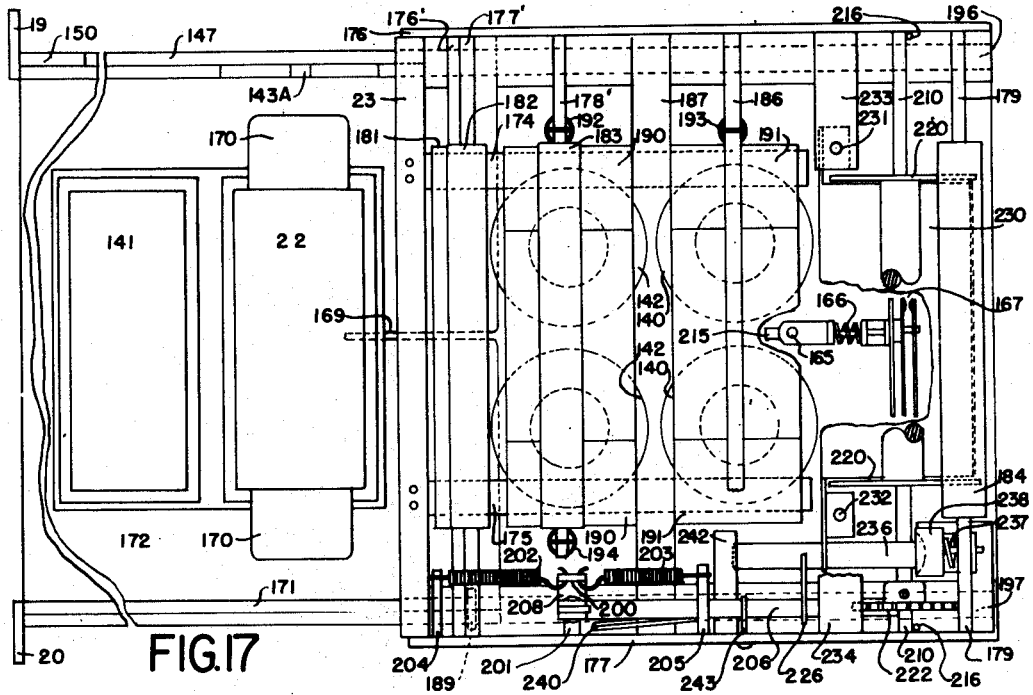
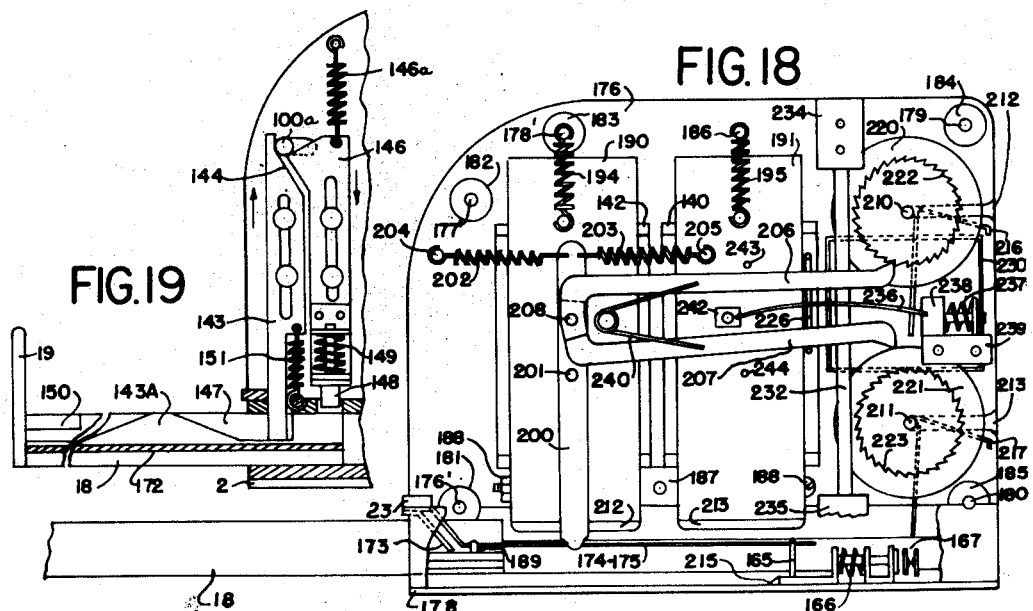
INVENTOR.
CLARENCE MARBLE
BY
ATTORNEY

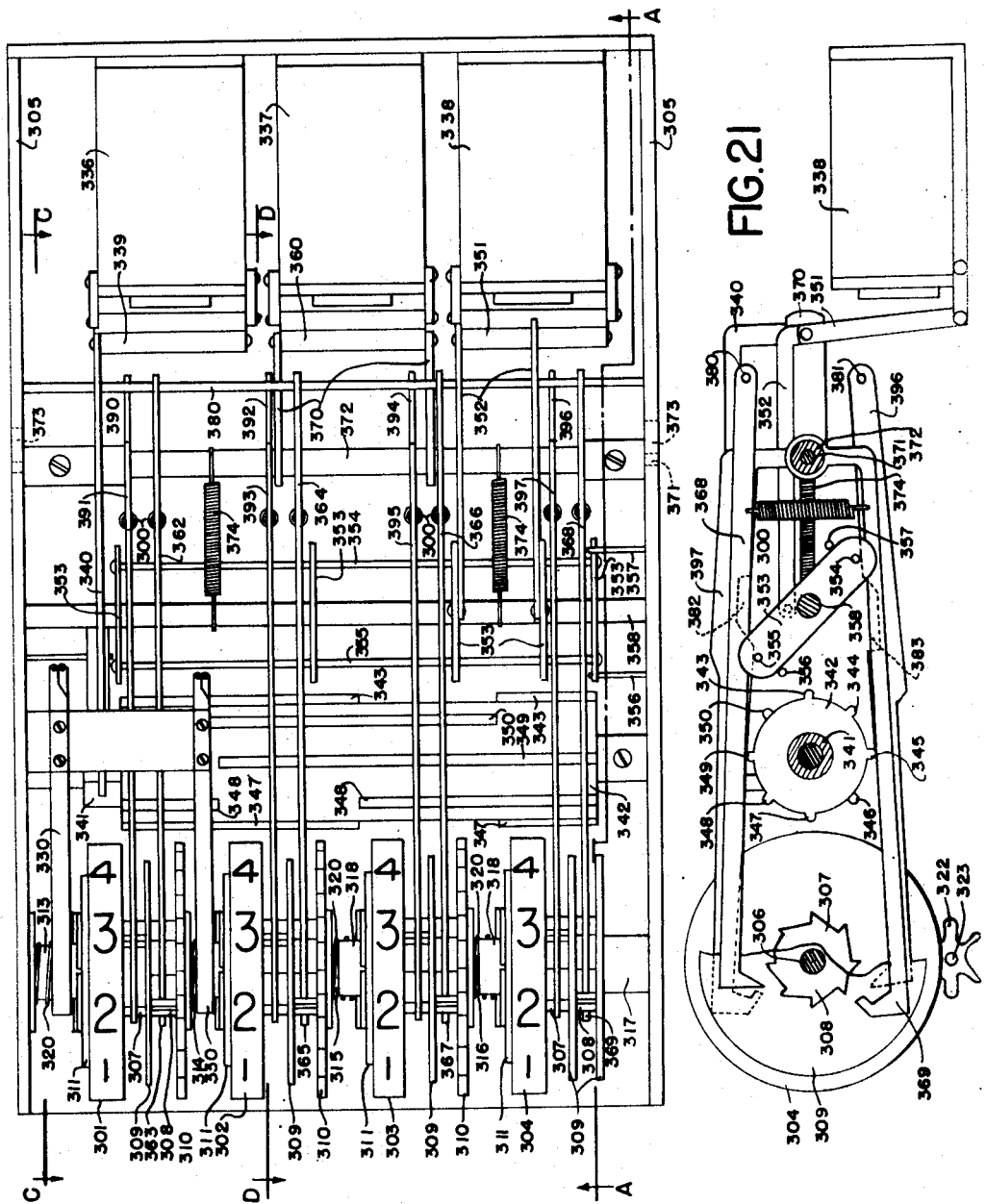

Dec. 26, 1950     C. MARBLE     2,535,218
AUTOMATIC CHARGE ACCOUNTING SYSTEM
Filed Jan. 11, 1945     11 Sheets-Sheet 8
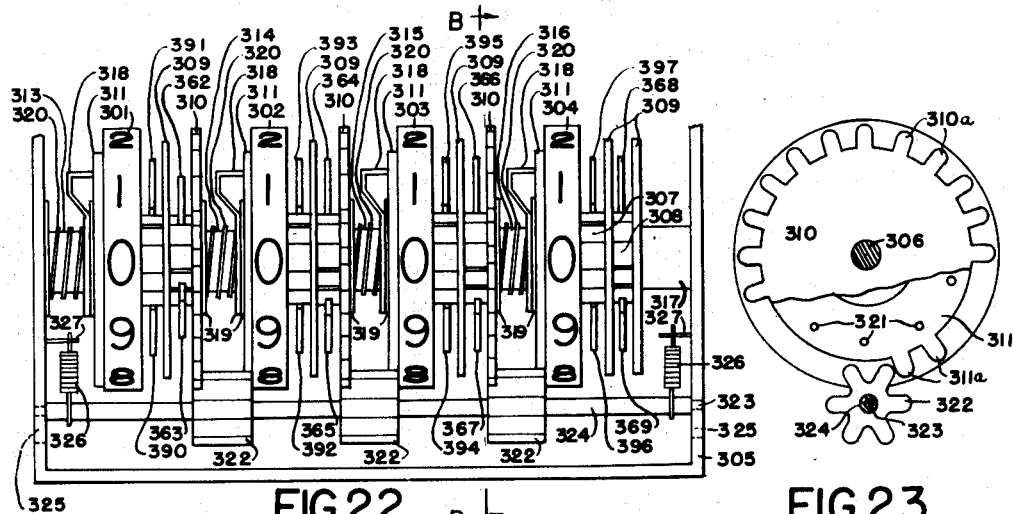
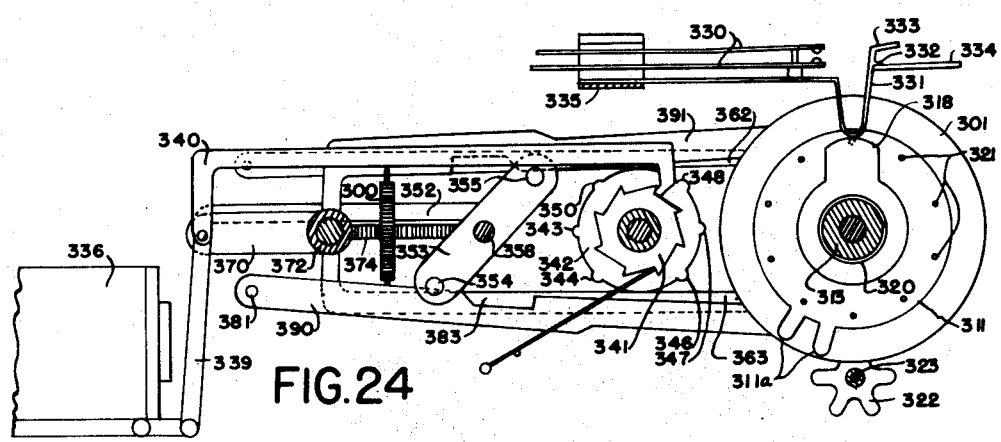
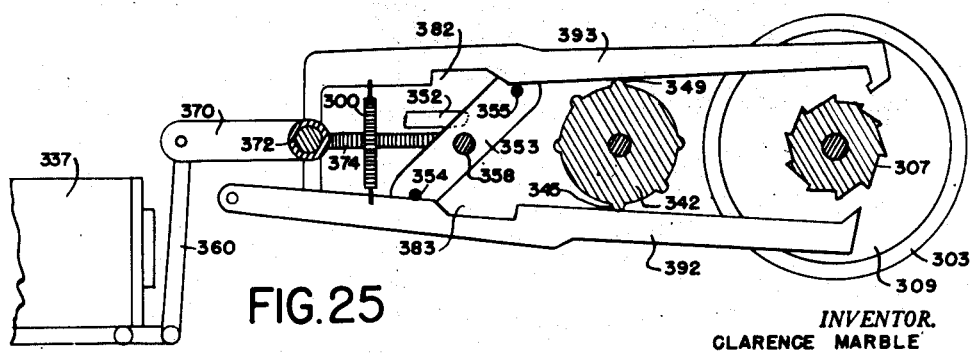
INVENTOR.
CLARENCE MARBLE
BY
ATTORNEY

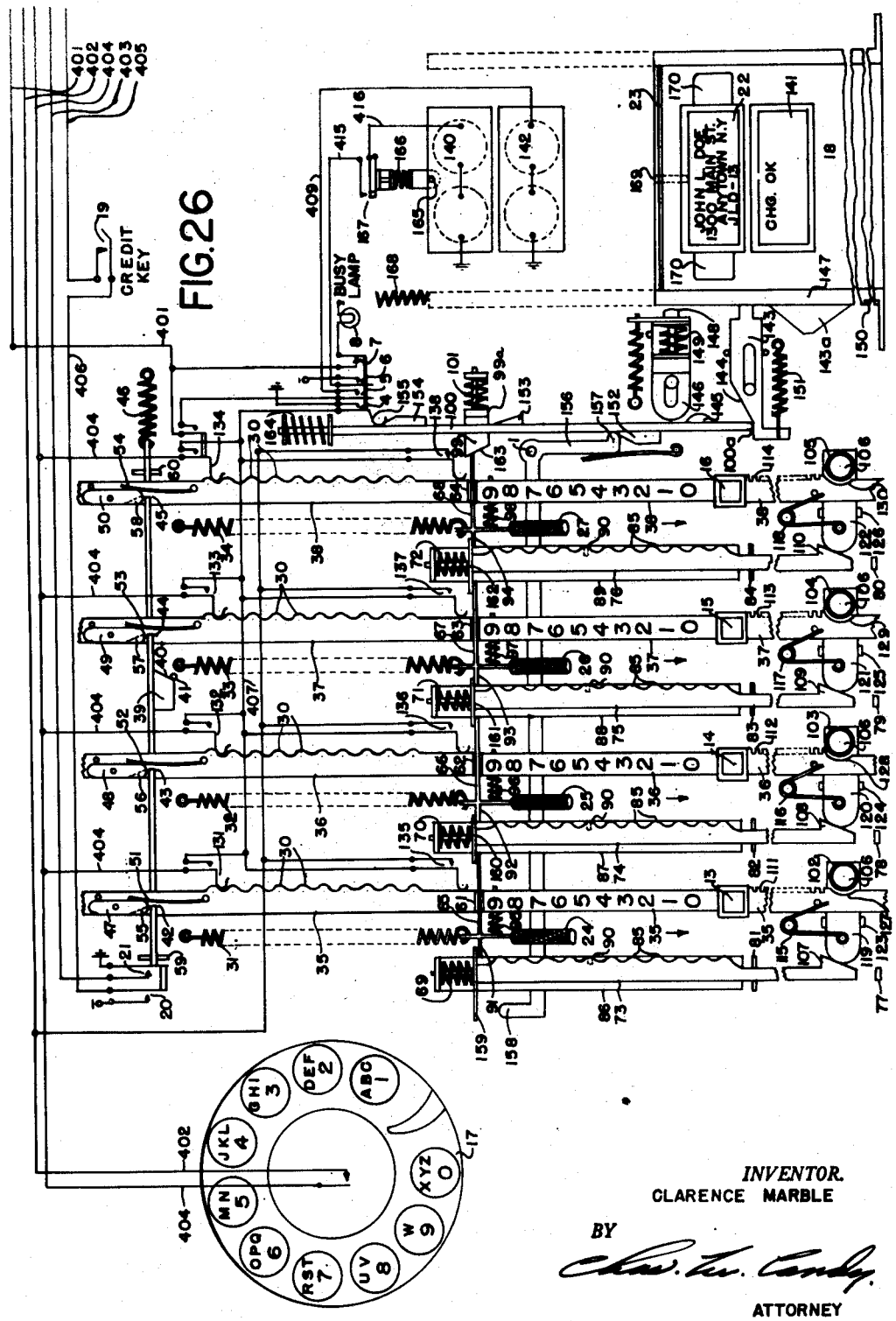

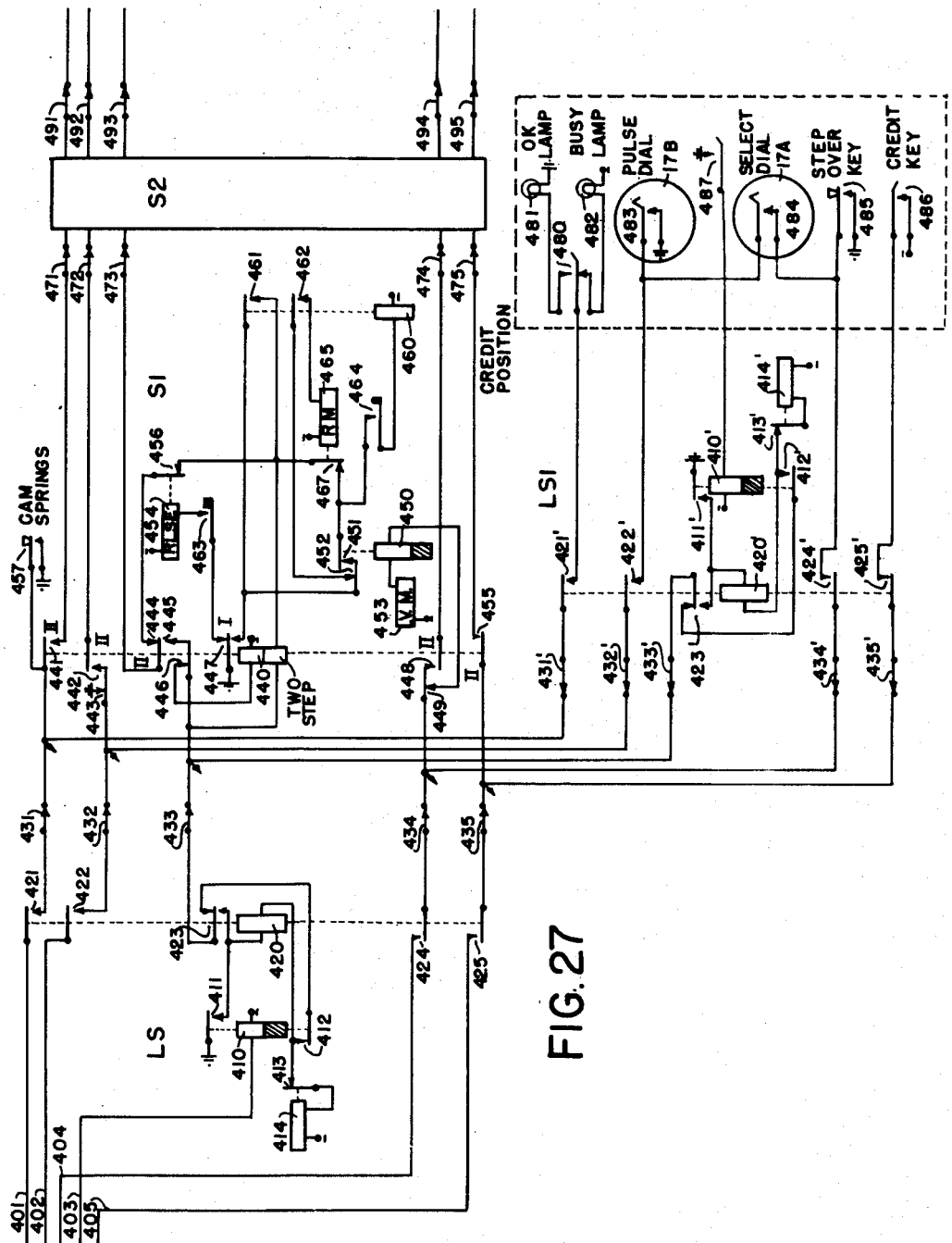

Dec. 26, 1950 C. MARBLE 2,535,218
AUTOMATIC CHARGE ACCOUNTING SYSTEM
Filed Jan. 11, 1945 11 Sheets-Sheet 11
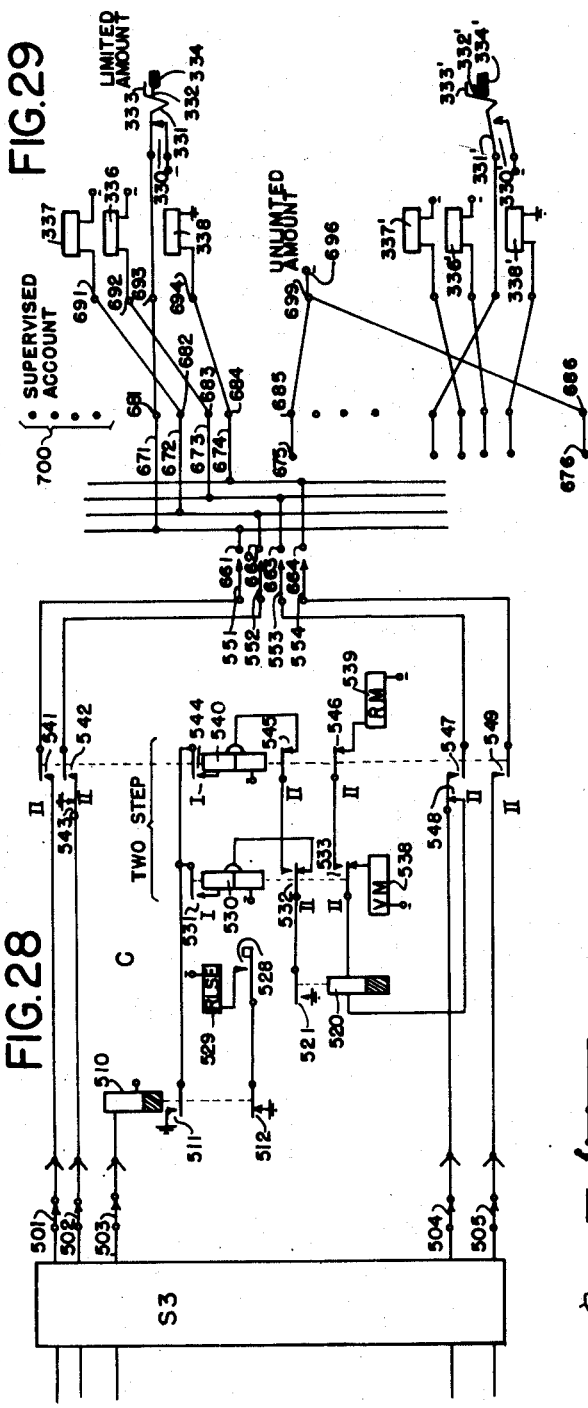
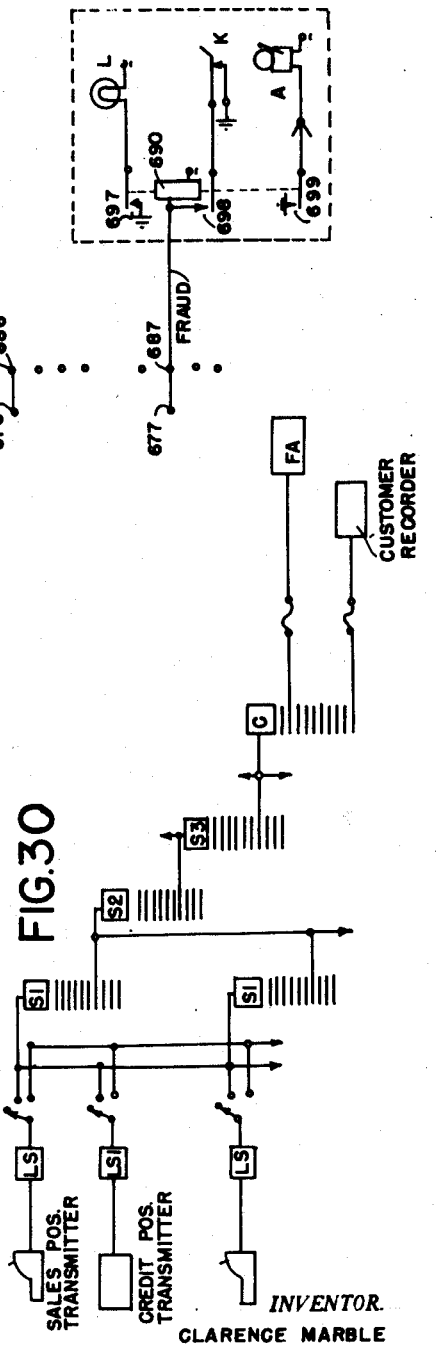
INVENTOR.
CLARENCE MARBLE
BY
ATTORNEY Patented Dec. 26, 1950

2,535,218

UNITED STATES PATENT OFFICE 2,535,218

AUTOMATIC CHARGE ACCOUNTING SYSTEM

Clarence Marble, Middlesex, N. Y., assignor to Automatic Electric Laboratories, Inc., Chicago, Ill., a corporation of Delaware Application January 11, 1945, Serial No. 572,407

11 Claims. (Cl. 235—61)

The present invention relates in general to an electrically controlled charge accounting system.

The system disclosed in the present application is applied to department or merchandising stores having charge accounts for customers who purchase merchandise on credit and the main object of the present invention is the provision of an automatic system of this type which speedily, accurately and secretly checks the credit status of a customer making a charge purchase by first selecting the customer's account, adding the amount to be charged to the previous charges in the account, and indicating to the salesperson that the charge is acceptable or requires attention by the credit office.

One of the features of the invention relates to the provision of means including customers' individual account registers which are electrically selected by an automatic switch train and operated from any sales position to accumulatively total the charge purchases and which controls the automatic approval of the charge purchases until the accumulated total exceeds the established credit limit for such customers.

Another feature relates to the circuit means and connections whereby a salesperson may automatically signal a store official and advise such official automatically of the location at which a fraudulent charge purchase is being attempted.

Another feature relates to the provisions for automatically subtracting an amount, corresponding to the purchase price of the goods returned for credit by a customer, from the customer's individual register.

Another feature relates to the circuit arrangements for signalling the sales person in case a customer's account cannot be reached due to the circuit paths leading to the customer's recorder being busy.

Still further features relate to the mechanized construction and operation of the transmitting units located at the various sales positions and the individual customer's registers located at some centralized location, such as a credit room.

Another feature relates to the circuit connections in the centralized credit room whereby customers having different credit status have their individual terminals cross connected in accordance with such status. That is, customers having limited charge accounts have their individual terminals connected to individual customer registers which may be manually set for any desired credit limit; customers having unlimited charge accounts have their terminals permanently connected to an approval source of current and do not need any further equipment; customers which require personal credit supervision for each charge purchase have their terminals left unconnected as no equipment is needed thereon; and customers which are provided with individual sales registers but which, for the time being, have their approval source of current at the registers temporarily removed from connection with the customer's terminals in order to require personal credit supervision for each charge purchase.

Other features, not specifically mentioned, will be apparent from the following description of the drawings comprising Figures 1 to 30, inclusive.

Figure 1 is a front view of the transmitting unit, or transmitter.

Figure 2 is a side view of the transmitting unit, or transmitter.

Figure 3 is an end view of one of the key, or lever, mechanisms in the transmitting unit.

Figure 4 is a rear elevation of the key arrangement of the transmitting unit.

Figure 6:
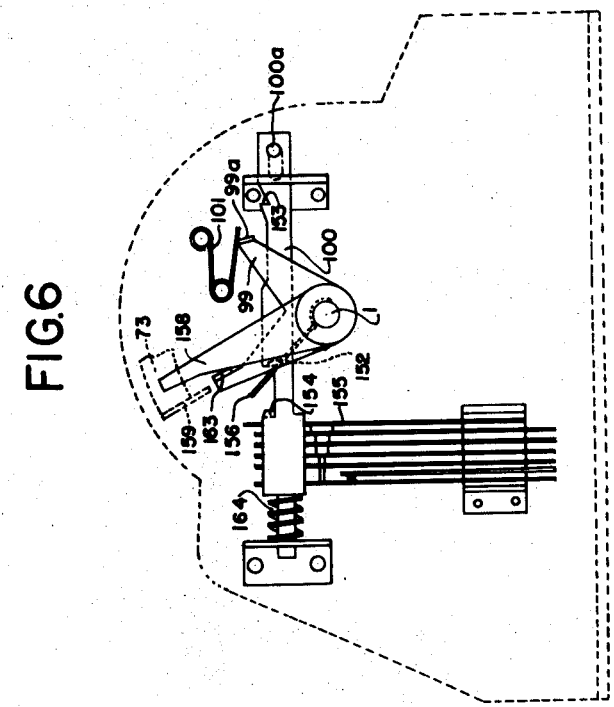
Figure 6 is an end view of the sending key equipment of the transmitting unit.

Figures 9 to 16, inclusive, show side and end views of the detail parts of one of the four sets of keys of the transmitting unit comprising an operating plate, an operating lever, or key, a fixed plate, and a restoring plate.

Figs. 10a, 12a, 14a and 16a show charts for the value operating plates, levers, fixed plates and restoring plates respectively.

Figure 17 is a plan view of the printing elements and sales check tray included in the transmitting unit.

Figure 18 is an end view of the printing elements and tray.

Figure 19 is an end view of the sending key control and locking equipment of the transmitting unit.

Figure 20 is a top view of the individual customer's register, or charge accumulating apparatus.

Figure 21 is a side view of the customer's individual charge register taken on line A—A of Figure 20.

Figure 22 is an end view of the customer's register.

Figure 23 is a section view of the register taken on lines B—B of Figure 22.

Figure 24 is a side view of the register taken on lines C—C of Figure 20.

Figure 25 is another side view of the register taken on lines D—D of Figure 20.

Figure 26 is a "functional" layout and circuit diagram of the transmitting unit.

Figures 27 and 28 show a circuit diagram illustrating the automatic switches used in establishing connections to customer's registers or to customer's account numbers.

Figure 29 is a circuit diagram illustrating in part how a few of the customer's registers are accessible to the automatic switch train.

Figure 30 is a one line diagram illustrating in part the circuit connections and trunking laying of the system.

Before proceeding with the detail description of the drawings, it is believed advisable to give a general description of the system and operation. For this purpose it will be assumed that the necessary equipment is installed in a merchandise department store for checking the status of customers purchasing merchandise goods on credit. Each sales person, or department, is provided with a transmitting unit and at the credit office, or some other centralized location, a panel is provided carrying terminals for each customer's charge account. A large portion of the accounts, which have unlimited charge accounts, will not have any equipment associated with their individual terminals. Other accounts which require personal credit supervision for each charge purchase, likewise will have no equipment associated with their individual terminals. A small portion of the accounts, which have limited charge accounts, will have equipment, such as a customer's individual register, connected to their individual terminals. In addition to this apparatus, automatic switches, such as commonly used in automatic telephone systems, are provided to select and connect with the customer's individual terminals.

It will now be assumed that John L. Doe, 1300 Main Street, Anytown, N. Y., having a limited charge account, desires to make a charge purchase of an article of merchandise for the amount of $6.95. The sales person, or clerk, places the usual salescheck in the tray associated with the transmitting unit and also adjusts the levers, or keys, of the transmitter until the numerals 695 appear in the windows of the transmitter. The operation of the levers cause the rotary lineswitch individual to this transmitter to select an idle selector switch. Selection of the correct account terminal is accomplished by dialling the customer's code number to operate the train of selector and connector switches to the proper terminal. The code number may be obtained by reference to a credit plate or card presented by the customer whose code number in this case is JLD-13. Having completed dialling, the sales person then pushes the tray holding the sales check inward which causes the previously adjusted levers to sequentially return to normal. The highest denomination lever first returns to normal to transmit pulses corresponding to its previously set position, after which a "stepover" pulse is transmitted to the customer's individual register. In the same manner the next highest denomination lever followed sequentially by remaining levers thereafter sequentially transmit pulses to the customer's register to cause such register to register and add the sales price to any previous registrations therein. If the charge sale is satisfactory, and the accumulative total in the customer's register does not exceed the customer's established credit limit, the sales check has an OK or other indication of its acceptance printed upon it. If the charge sale is unsatisfactory, thereby requiring personal credit supervision, the sales check will not be printed with an acceptance indication. The control of the printing of the acceptance indication is governed by the presence or absence of an approval source of current connected through switching contacts on the customer's register, such contacts being operated to remove the approval source when the amount to be charged exceeds the established credit limit.

The same procedure, as described above, is used when customers having unlimited charge accounts make charge purchases. In these cases no register is required and the approval source of current is permanently connected to the customer's individual terminal to control the printing of the OK indication on the sales check. The customers who need personal credit supervision for each charge purchase likewise have no register and have no approval source of current associated with the individual terminals with the result that no acceptance indication is printed on the sales check.

*Mechanical description of transmitting unit*

Referring now specifically to Figures 1 to 16, inclusive, the transmitting unit comprises primarily four sets of disks and associated keys, or levers enclosed under the casing 3 and mounted on a frame 2. The casing 3 is shaped in the manner shown in Figures 1 and 2 and include slots in which the levers, or keys, 24, 25, 26 and 27 are manually moved. In the front of casing 3 are windows 13, 14, 15 and 16, one window for each set of disks, to visually indicate the amount set up by the manual operation of the levers. A busy lamp is also shown on the front of the casing to indicate to the sales clerk that all trunks are busy leading to the customer's charge register. A dial 17, such as commonly used in telephone systems, is mounted on the frame 2 by means of which automatic switches, also of the type used in telephone systems, are controlled to select and seize the customer's charge register. A sales check tray 18, shown in open position in Figure 2, is provided for insertion of the sales check so that such check may be stamped with an "OK" indication provided the customer has not exceeded his charge account limit. Handles 19 and 20 are provided for moving tray 18.

Figure 5:
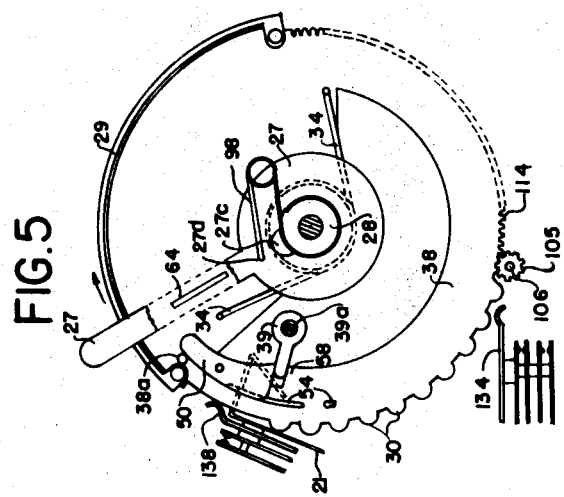
Figure 5 is a detail view of one of the operating plates and its associated key lever.
Figure 8:
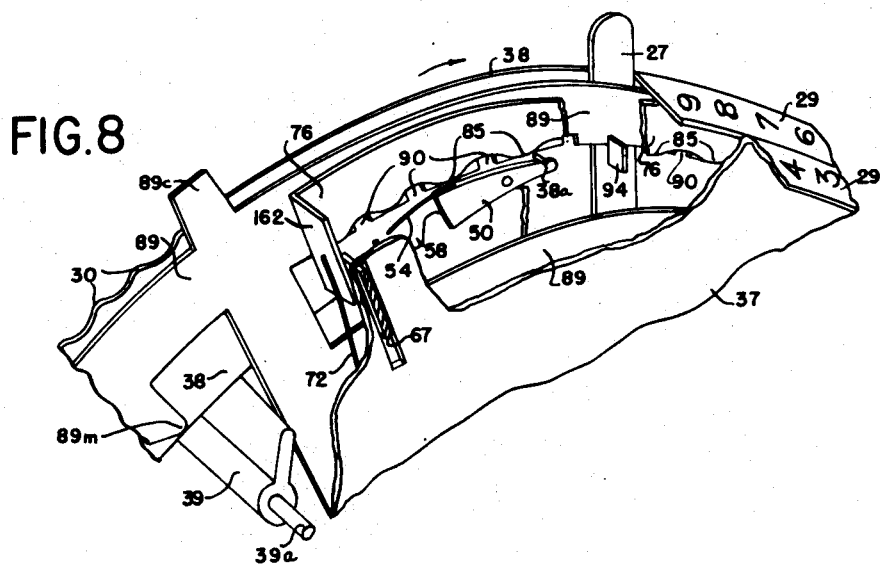
Figure 8 is a perspective view of one of the four sets of keys, or levers, of the transmitting units.
Figure 15:
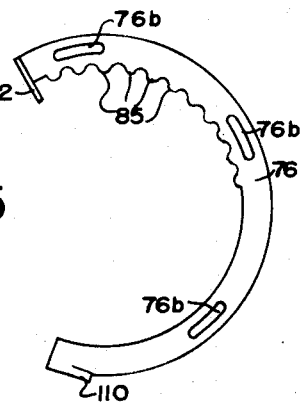
Figure 16A:
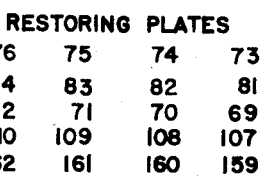
Figure 16:
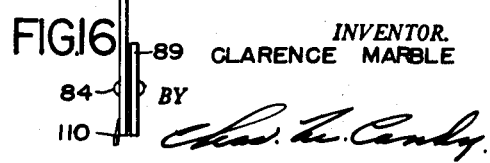

The four sets of keys, or levers, employed for the presentation and transmission of numerical values representing amounts to be charged to the customer, are operated by a rotary movement in the direction indicated by arrows in Figures 3, 5 and 8 to establish values to be transmitted. The return to normal of these sets of keys are in a reverse direction. Figure 4 shows a rear elevation of the four sets of keys and, for clarity, details of only one set of keys are shown in Figures 9 to 16, inclusive, while Figures 3, 5 and 8 show partial assembly views. Each key set includes an operating plate, such as plate 38 (Figures 9 and 10), a lever, such as lever 27 (Figures 11 and 12), a fixed plate such as plate 89 (Figures 13 and 14), and a restoring plate, such as plate 76 (Figures 15 and 16.) While only the details of one key set are shown in Figures 9 to 16, inclusive, it will be understood that the remaining three key sets each comprise similar elements, having different reference characters to facilitate the description in regard to their sequence of operation.

Figures 10, 10A:
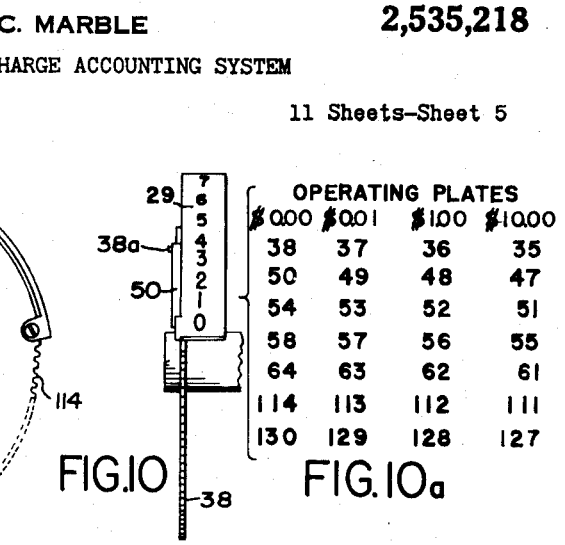
Figures 12, 12A:
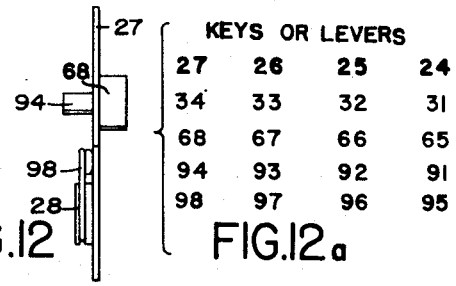
Figures 14, 14A:
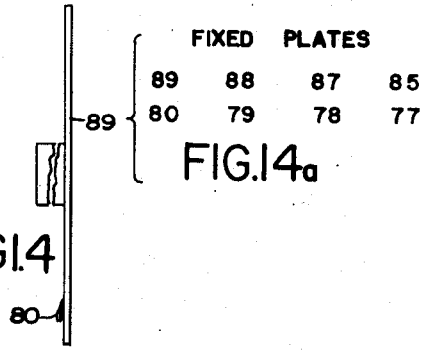

Chart Fig. 10a shows the reference characters for the four different value operating plates 35, 36, 37 and 38 and the reference characters of the details individual to such plates. Chart Fig. 12a shows the reference characters for the four keys or levers 24, 25, 26 and 27 and their individual details. In a similar manner Figs. 14a and 16a show charts, respectively, for reference characters for the four fixed plates and the four restoring plates. For example, reference characters of the four different value operating plates 35, 36, 37 and 38 are arranged in four vertical rows; the reference characters of the details of each operating plate appearing in the vertical row directly below the reference character of the corresponding operating plate. Similar details on the respective operating plates have their reference characters arranged in horizontal rows. Figs. 12a, 14a and 16a are similarly arranged.

All of the principal moving elements of the transmitter, except the governor, operate with a rotary movement on shaft 1 as their axis. Shaft 1 is supported in frame 2 by means of supports. Operating levers, or keys, 24, 25, 26 and 27 are rotatably mounted on shaft 1. Levers 24, 25, 26 and 27, respectively; carry lips 91 and 65, 92 and 66, 93 and 67, and 94 and 68. Each lever has a hole, such as hole 27C shown in Figures 5 and 11, thru which shaft 1 passes. This hole is elongated to permit the levers, such as lever 27, to be raised or lowered as required for operating and locking purposes. Each lever is held in a raised or locking position by a compression spring. Spring 98 is the compression spring for lever 27 and each lever has a similar spring. As will be seen in Figures 5, 11 and 12 one end of spring 98 encircles the slot in washer 28 which rides on shaft 1 and the other end engages hole 27d in lever 27. In operating levers 24, 25, 26 and 27 it is necessary to press downward slightly against the pressure of the compression springs. Each lip, such as lip 68 on lever 27, passes thru a slot, such as slot 64 in operating plate 38, for controlling the operation of its associated operating plate.

Figure 9:
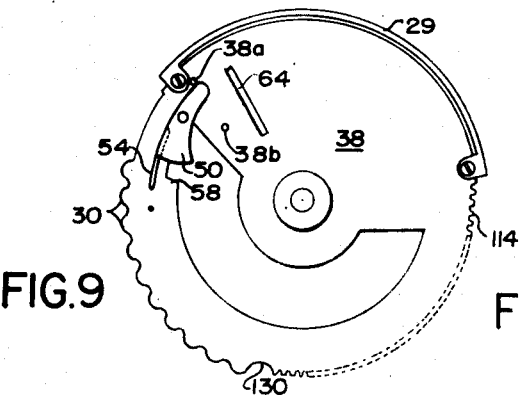
Figure 11:
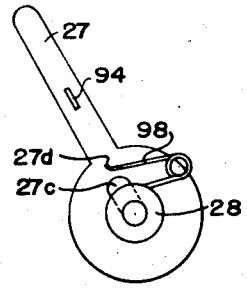

The position to which the operating plates, such as plate 38, are operated determines the number of pulses to be transmitted by lifts 30 on each of the operating plates. Each operating plate has gear teeth, such as gear teeth 114 on plate 38, which, at the proper time, mesh with the governor controlling gears to control the return speed of the operating plates during pulse transmission. Each operating plate carries a number index plate, such as plate 29 (Figures 9 and 10), which is attached to its associated operating plate by means of rivets. Each operating plate, such as operating plate 38, carries a pawl, such as pawl 50 which pivots on a rivet in the operating plate. Each pawl has a groove for holding the free end of the pawl spring, such as spring 54. The pawl springs are anchored in their associated operating plates as shown in Figure 9. A pin in each of the operating plates, such as pin 38a in operating plate 38, holds the pawls in the position shown.

A compression spring 34 (Figure 5) anchored in hole 38b (Figure 9) in operating plate 38 and in hole 89a (Figure 13) is provided for restoring the operating plate 38 and lever 27 when the lever is released for pulse transmission. Lever 27 and operating plate 38 operate together due to the lip 68 of lever 27 extending thru slot 64 in operating plate 38. Similar compression springs 33, 32 and 31 are provided for similar operating plates 37, 36 and 35 and levers 26, 25 and 24, respectively. A lift, such as lift 58 on operating plate 38 (Figure 9), is provided on each operating plate to operate the off-normal bar 39 (Figures 3, 4 and 5) when any one of the levers and its associated operating plate is operated. Lifts 57, 56 and 55 on plates 37, 36 and 35 respectively correspond to lift 58 on plate 38. Lever 27 and plate 38 are separated on shaft 1 by a washer and similar washers separate the other levers from their associated operating plates.

Figure 13:
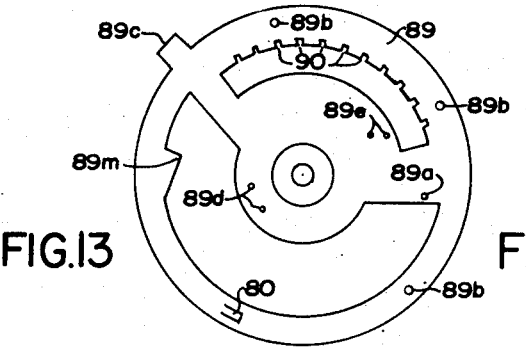

Each key set has a fixed plate similar to the fixed plate 89 (Figures 13 and 14). Shaft 1 passes thru a hole in plate 89 and a projection 89c passes thru the casing 3 to hold plate 89 in fixed position. Fixed plate 89 is separated from lever 27 by washer 28. Holes 89d hold the anchored end of spring 72 (Figure 3) which operates the restoring plate 76. Slots 90 are provided in plate 89 to hold lever 27 in operated position by engaging its lip 94 until released by lifts 85 on restoring plate 76. Holes 89e hold the anchored end of spring 46 (Figure 3) which restores the off-normal bar 39 to its normal position at stop 89m. Stop 80, punched out of plate 89, controls the length of movement of restoring plate 76. Restoring plate 76 (Figure 15) is slidably secured to fixed plate 89 by means of rivets 84 in holes 89b extending thru the slots 76b in restoring plate 76 as shown in Figures 3 and 16.

Each keyset also has a restoring plate, similar to the restoring plate 76 (Figures 15 and 16), which is also slidably secured to its corresponding fixed plate. Each restoring plate carries lifts 85 which when in normal position cover the slots 90 in the fixed plates. Each restoring plate has a lip, such as lip 162, which is engaged by a lip, such as lip 94 of lever 27, on its associated lever on the return of such lever to normal position. A lift, such as lift 110, is provided on each restoring plate for disengaging the governor gears, such as gear 105, from the gear teeth 114 on the operating plates when the restoring plates are in operated positions.

When any operating lever, such as lever 24, 25, 26 or 27, is operated off-normal bar 39 causes all the remaining levers to move to an off-normal position. Normally the lips 65, 66 and 67 on levers 24, 25 and 26 engage lips 160, 161 and 162 on restoring plates 74, 75 and 76 and the lifts 85 on these restoring plates cover the slots 90 in the fixed plates 87, 88 and 89.

When any one lever is moved to an operated position, the restoring plates spring impells the restoring plate to move with the associated lever until stopped by the stop on the fixed plate. For example, assuming that the lever 27 is the first lever moved, then when lever 27 (Figure 3) is moved to the right, thereby removing lip 94 from lift 162, restoring plate spring 72 is effective to slide restoring plate 76 in its slots 76b until the lower end of plate 76 strikes the stop 80 on fixed plate 89. This movement of plate 76 and its lifts 85 clear the slots 90 in fixed plate 89 to permit lip 94 of lever 27 to be stationed at any desired position in one of the slots 90. The movement of lever 27, due to its lip 68 being in slot 64 of operating plate 38, caused lift 58 of plate 38 to rotate off-normal bar 39. Off-normal bar 39 extends across the four key sets and pivots on a rod 39a secured to frame 2. The moveable end of off-normal bar 39 normally rests on stops, such as stop 58 of operating plate 38, and stops, such as stops 89m of fixed plate 89. The movement of any operating plate, such as 38, rotates the end of off-normal bar 39 to thereby operate the remaining three levers 26, 25 and 24 and operating plates 37, 36 and 35 to an off-normal position. This movement of the three remaining levers 26, 25 and 24 by movement of their lips 93, 92 and 91, corresponding to lip 94, permits the restoring plate springs 71, 70 and 69, corresponding to 72, to move the restoring plates 75, 74 and 73, corresponding to 76, a sufficient distance to cause the lifts 85 to uncover the slots 90 in the fixed plates. The said three remaining levers 26, 25 and 24, not operated manually, will have lips 93, 92 and 91, corresponding to lip 94, fall into the first uncovered slot 90 in its associated fixed plate. That is, lip 93 on lever 26 will fall into the first notch 90 on fixed plate 88, lip 92 on lever 25 will fall into the first notch 90 on fixed plate 87, and lip 91 on lever 24 will fall into the first notch 90 on fixed plate 86. The levers 24, 25 and 26 will be held in these first notches 90 by springs 95, 96 and 97, until manually moved to a new position or until released by the operation of the restoring plate. The operator can move any desired ones of the remaining levers to the desired position by first pressing down on the lever to disengage its lip 91, 92 or 93 from the locking slot 90 and then moving it to the desired position. The off-normal bar 39 remains in an operated position until all key groups have returned to normal and the pawls 47, 48, 49 and 50 are pivoted to permit the re-engagement of the off-normal bar 39 with the operating plates 35, 36, 37 and 38. Spring 46 restores the off-normal bar 39 to its normal position operation.

The restoring plates 73, 74, 75 and 76 are held non operative by lips 91, 92, 93 and 94 when the levers are normal. The restoring plates 73, 74, 75 and 76 also control the sequential return to normal of the levers 24, 25, 26 and 27 and associated operating plates 35, 36, 37 and 38 when such restoring plates are operated by the lips, such as lips 65, 66 and 67, on the levers 24, 25 and 26 of a preceding group. Except for the key group including lever 24, corresponding to the "tens dollar" value and which is started by the sending key 100, each operating key group is operated in turn by a lip of the preceeding key group engaging the lip on the restoring plate. For example, when the sales check tray 18 is pushed in, the sending key, or bar 100, causes rotation of arm 158 (Figs. 4 and 6) which strikes lip 159 on restoring plate 73 and moves plate 73 a sufficient distance to cause lifts 85 to cover the slots 90 in fixed plate 86 thereby forcing the lip 91 of lever 24 out of notch 90 in plate 86. Lever restoring spring 31 is then effective to return lever 24 and operating plate 35 to normal. Just before lever 24 reaches its normal position lip 65 on lever 24 engages and moves lip 160 of restoring plate 74. Restoring plate 74 moves and causes its lifts 85 to cover notches 90 in fixed plate 87 thereby forcing the lip 92 of lever 25 out of notch 90 in plate 87. Lever restoring spring 32 is then effective to return lever 25 and operating plate 36 to normal. Just before lever 25 reaches its normal position lip 66 on lever 25 engages and moves lip 161 of restoring plate 75. Restoring plate 75 causes its lifts 85 to eject lip 93 of lever 26 out of notch 90 in fixed plate 88. Lever restoring spring 33 then returns lever 26 and operating plate 37 to normal. Just before lever 26 reaches normal position lip 67 on lever 26 moves lip 162 of restoring plate 76. Restoring plate 76 causes its lifts 85 to eject lip 94 of lever 27 out of notch 90 in fixed plate 89. Lever restoring spring 34 returns lever 27 and operating plate 38 to normal. Just before lever 27 reaches normal position lip 68 on lever 27 engages lift 163 of arm 99 to thereby unlock and permit release of the sending key, or bar 100.

Associated with each operating plate are two sets of spring contacts. Referring to Figures 3 and 5, the upper set of contacts 138 are associated with operating plate 38 and are operated by lifts 30 to transmit a number of pulses corresponding to the operated position of lever 27. The lower set of springs 134 is operated by lifts 30 on plate 38 to transmit a change-over pulse to the customer's register to synchronize the pulse transmission by the operating plates with their respective charge accumulating disks on the customer's register. Contacts 21, shown behind contacts 138 in Figure 5, are operated in response to the rotation of off-normal bar 39 and are provided to start the operation of a rotary lineswitch to select an idle selector switch while the amount to be transmitted is being set up on the keys, or levers.

Governing equipment is provided to control the speed of pulse transmission and is so arranged that the governing equipment is not in engagement except when pulse transmission is under way. As previously described, when any lever, or key, is actuated to an off-normal position its associated restoring plate was also actuated against a stop on the associated fixed plate. As will be seen in Figure 3 by way of example, when lever 27 is actuated, restoring plate 76 moves until it abuts against stop 80 on fixed plate 89. Due to this movement of plate 76, a lift 110 on plate 76 moves into engagement with a collar on the governor gear 105, thereby movably sliding gear 105 out of mesh with the teeth 114 on operating plate 38. Therefore, as long as lever 27 is locked in actuated position the lift 110 on restoring plate 76 disengages the governor gear 105 from the gear teeth 114 of operating plate 38. When lever 27 is released and restoring plate 76 returns to normal lift 110 disengages from the collar of gear 105 and permits the associated gear spring 118 (Fig. 4) to move gear 105 in mesh with teeth 114. The governor gear 105 is therefore only effective during the return to normal of plate 38 to control the speed of pulse transmission. In a manner similar to that just described the governor gears 102, 103, 104 and 105 successively mesh with the teeth on their corresponding operating plates 35, 36, 37 and 38 as such operating plates are successively returned to their normal positions. A description of the governing equipment follows. A governor shaft 106 extends across the transmitter, as best seen in Figure 4, upon which four governor gears 102, 103, 104 and 105 are slidably mounted by means of a key in shaft 106 and a key notch in each governor gear. The governor gears rotate the shaft 106 due to the key arrangement but may slide longitudinally on shaft 106. Shaft 106 is held in frame 2 by means of the collars and set screws shown. Governor drum 33 is centered on shaft 106 and is attached to frame 2 by screws. Attached to shaft 106 is the governor consisting of four arms 33a made of spring material and carrying pads 33b of fibre or similar friction material at their tips. These pads are held in place by rivets. Springs 115, 116, 117 and 118 respectively hold the gears 102, 103, 104 and 105 in operated position. As previously described, the gears are only in mesh with the gear teeth on the operating plates during pulse transmission. To insure that one operating plate will not interfere with the operation of another operating plate recesses 127, 128, 129 and 130, shown in Figure 26 and in Figure 9, are provided in each operating plate. The governor gears will revolve in these recesses after the operating plate has returned to normal.

Figure 7:
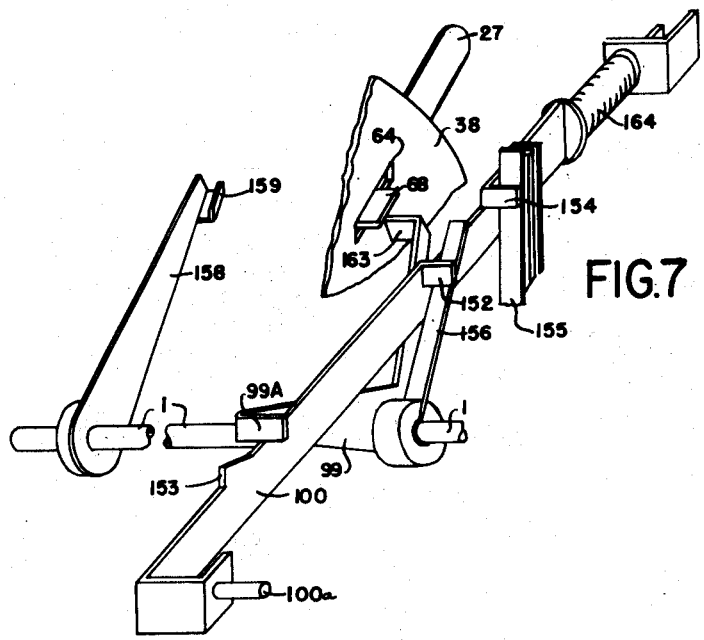
Figure 7 is a perspective view of a portion of the sending key equipment.

The sending key equipment is carried on shaft 1 with the transmitting equipment but for clarity its assembly is shown in Figures 4, 6 and 7. The function of the sending key is to start transmission and to restore the transmitter to normal after transmission is completed. The sending key is operated by the inward movement of tray 18 which is provided to carry the sales check into the printers. A detailed description of the sending key follows.

As previously described, the return to normal of one transmitter key, or lever, group causes the adjacent key group to start its return to normal. In order to start this sequence of clearing operations, mechanism associated with the tray 18 engages pin 100a which is carried by arm 100. The sending bar, or arm 100, is supported in frame 2 by brackets (Fig. 6). When tray 18 is pushed inwards the pin 100a is engaged and moved by a lift 144 on slide 143 to operate arm 100 and compress spring 164 (Fig. 19). Lip 152 on arm 100 causes arm 156, attached to shaft 1 by a collar and set screw, to move downward (Figure 7) revolving shaft 1 slightly. This movement of shaft 1 causes arm 158, which is attached to the opposite end of the shaft, to move against the lip 159 of restoring plate 73 of the "tens dollars" key group to move restoring plate 73 slightly. The off-normal movement of the key groups caused lip 99a of arm 99 to move downward impelled by spring 101 (Fig. 6) into engagement with arm 100 so that with the inward movement of arm 100 the boss 153 passes under lip 99a to lock the arm 100 in operated position with spring 164 compressed. The inward movement of arm 100 causes the operation of the spring contacts associated with the contact set 155.

When arm 158 engaged lip 159 of restoring plate 73 it moved plate 73 to its normal position, thereby causing lifts 85 to unlock lever 24 and its lip 91 from the engaged notch 90 in fixed plate 86. Lever spring 31 is now effective to return lever 24 and its associated operating plate 35 to normal position. The lifts 30 on operating plate 35 operate the spring set 138 to transmit a number of pulses corresponding to the numerical value to which lever 24 was operated. In the same manner as previously described the remaining levers and their associated operating plates are sequentially restored. When the last lever and operating plate is restored, in this case the "cents" group lever 27, lip 68 on lever 27, engages lip 163 and operates arm 99, thereby tripping that arm and causing lip 99a to disengage stop 153 of bar 100. Spring 164 now returns bar 100 to normal position restoring the spring contacts in set 155 to normal. The removal of pressure on arm 156 by lip 152 causes shaft 1 and arm 158 to return to normal.

The initiation of the sending operation of the transmitter is started in response to the insertion of the tray 18 as previously explained. When tray 18 is moved inward lift 143A engages and raises bar 143 (Figure 19) to cause lift 144 to move pin 100a to the right thereby operating the sending bar, or arm 100, as previously described. In addition to operating sending bar 100, pin 100a in moving to the right also operates locking bar 146 downward. Pin 148 rides on the upper edge of bar 147 of tray 18 until the locking slot 150 therein is directly below pin 148 which is now impelled by spring 149 into slot 150 to lock the tray 18 in closed position. As will be noticed, the lift 143A no longer controls the bar 143 with the result that bar 143 is pulled down to its normal position by spring 151. It will also be remembered that sending bar 100 is locked in operated position until after completion of the sending operations. When the sending operations are completed sending bar 100 is unlocked and released. In releasing, sending bar 100 moves pin 100a to the left thereby releasing locking bar 146 to cause spring 146A to withdraw locking pin 148 from slot 150 to release the tray 18. The tray 18 is operated to open position by a spring such as spring 160 shown in the functional drawing in Figure 26.

Due to lift 143A it will be noted that bar 143 operates with either inward or outward movement of tray 18 but tray 18 can only be locked in closed position in case one or more levers of the transmitter have been moved to lock the sending bar 100. In case the tray 18 is pushed inward at a time when all the levers are normal the sending bar 100 will not lock with the result that spring 146A restores locking bar 146 to cause pin 100a to move back to normal, thereby restoring sending bar 100. In this case tray 18 was not locked in closed position and therefore restores to open position. This last mentioned operation of tray 18 may be used to operate the printing mechanism if a printing operation with a credit plate is desired for addressing purposes and no transimssion is required.

*Description of printing equipment in transmitter*

The sales check tray and printing elements are shown in Figures 17 and 18 in which Figure 17 shows a plan view of the printing elements with the outer casing removed and in which the printing ribbon has also been removed in order to more clearly show such elements, while Figure 18 is an end view with the outer vertical plate 177 removed to more readily show the mechanism.

On making a transmission for approval of a charge the sales check with associated carbons and duplicate copies are placed in tray 18 which consists of two side frames 147 and 171 and a bottom plate 172 on which credit plates 141 and 22 are placed. Finger hole 170 is provided to permit placement and removal of the customer's credit plate 22 without difficulty. Handles 19 and 20 are provided for operation of the tray. Lift 143A and locking slot 150 on side frame 147 are provided to control the sending and clearing operations in connection with the transmitter. The inward end of side frame 171 carrying pin 189 causes operation of bar 200 and the printing ribbon ratchet arms 206 and 207 when tray 18 is moved inward. Extending across tray 18 is a plate 173 the lower edge of which is pivotally attached to the side frames of the tray by pins established in holes in the side frames. This plate 173 normally acts as a stop for insertion of the sales check when the tray is open and when the tray 18 is moved inward the plate 173 rotates on its pivots and clamps down on the sales check when it engages bands 174 and 175. The plate 173 and the sales check thereafter slide under the bands 174 and 175. A spring (not shown) is provided for restoration of stop 173 to its normal position when tray 18 is opened.

A slot 169 is provided in the floor of tray 18 into which pin 165 enters to prevent operation of contacts 167 and its printer when no customer's credit plate is in use.

The printing unit is contained within side and bottom frames 176, 177 and 178. Side frame 177 has been omitted in Figure 18. The printing unit consists of two magnetic printing solenoids or magnets; rollers for guidance of printing ribbon; apparatus for reversing the printing ribbon and various other mechanical and electric control features.

The inward movement of tray 18 is guided by the engagement of side frames 147 and 171 with channels 196 and 197. Extending across the printing unit is bar 23 which supports two flat bands 174—175 of spring material extending into the printer to prevent sales checks from jamming or wrinkling while being printed. These bands 174 and 175 also cause operation of sales check stop 173 when tray 18 is moved inward as previously described.

Also extending across the printing unit are rods 176', 177', 178', 179 and 180 which carry rollers 181, 182, 183, 184 and 185 for supporting the printing ribbon (not shown). Rod 178' in addition to supporting roller 183 also supports springs which hold the armature of one of the printers in its non-operated position. Rod 186 (shown broken) extends across the case and holds the armature of the other printer in its non-operated position.

The printing relays 140 and 142 are held in place by bar 187 which extends across the case and to which the base of the relays are attached at each end by means of bolts 188 (Figure 18).

Two printing solenoids or magnets are provided: one for printing the charge acceptance and the other for printing information carried on the credit check if one is used. The charge acceptance printer consists of two of the usual magnet coils 142 wired together and mounted on a base. The armature consists of a frame 190 surrounding the coil and has a flexible printing platen 212 attached to its lower end. The credit check printer consists of coils 140, armature 191 and a similar platen 213. Guides for the armatures are not shown. Springs 192, 193, 194 and 195 attached to rods 178' and 186 restore the armatures after operation.

The printing ribbon equipment consists of two reels to which the ends of the ribbon are attached: ratcheting equipment which will change the position of the ribbon each time a sales check is inserted and reversing equipment to automatically change the pulling reel when a certain level of ribbon is reached.

Bar 200 which pivots on pin 201 is held in its normal position by opposing springs 202 and 203 which are anchored by pins 204 and 205. The lower end of bar 200 engages a pin 189 of sales check tray 18 on any complete movement of the tray either inward or outward. On engaging pin 189 bar 200 moves on pivot pin 201 which causes ratcheting arms 206 and 207 also to move due to being pivoted on bar 200 by pin 208. Ratcheting arms 206 and 207 move in unison. One of them is always in engagement with a ribbon reel ratchet wheel and the other disengaged. It can be seen that ratcheting is accomplished by the return of bar 200 to normal on an inward movement of tray 18 and on an outward movement of tray 18 the ratcheting is accomplished while bar 200 is in engagement with pin 189.

Shafts 210 and 211 are attached to the ribbon reels 220 and 221 and are carried in slots 212 and 213 of side frame 176 and similar slots in side frame 177. Springs 216 and 217 hold shafts 210 and 211 in place at side frame 176 and similar springs hold them at side frame 177. The springs permit removal of the ribbon reels when desired. Also attached to shafts 210 and 211 are ratchet wheels 222 and 223, the operation of which has been previously explained.

In order to change the ribbon pulling operation from one reel to the other when desired a box 230 is provided between the two reels. This box 230 moves up and down on shafts 231 and 232 supported by brackets 233 and 234 and plate 235. Flanges on box 230 are used to slidably support one side of the box to the supporting shafts 231 and 232. A slot in one of these flanges engages a flat spring 236. As the ribbon level lowers or raises on reel 221 the box 230 raises or lowers on shafts 231 and 232 accordingly carrying the center of spring 236 with it. When it has carried the center of spring 236 slightly beyond a line between its two ends the spring will snap into a position where its center is ahead of that to which it was carried by the movement of box 230. Its curvature is determined by its size and the pressure exerted upon it by spring 237 which impels forward a moveable member 238 which supports the end of spring 236 and is guided and supported by bracket 239. Spring 236 carries a rod 226 which is bent over ratcheting arms 206 and 207 which are normally spread by spring 240. As the snapping action of spring 236 occurred this rod 226 caused the ratcheting arm which was engaged with a ratcheting wheel to be lifted clear and the other ratcheting arm to engage. Bracket 242 holds the anchored end of spring 236 and pins 243 and 244 limit the movement of the ratcheting arms. As the ribbon level on reel 221 reaches the maximum or minimum determined by the width of the slot in the flange of box 230 this automatic reversing operation will take place.

To assure that no printing operation will take place in the name and address portion of the sales check if no credit plate has been inserted, a pin 165 which controls operation of contact 167 is provided. If no credit plate 22 has been placed in tray 18 when it is moved inward pin 165 enters slot 169 of tray 18 and moves into the slot its maximum distance and no operation of contacts 167 takes place. If a credit plate is used it covers part of slot 169 and its edge engages pin 165 causing operation of contacts 167 by compressing spring 166 causing engagement of contacts 167. Pin 165 is carried on a moveable bracket and a stop 215 is provided in frame 178 for the moveable bracket carrying pin 165.

Customer's register

The customer's register, or the charge accumulating equipment is shown in Figures 20 to 25, inclusive, wherein Figure 20 is a top view; Figure 21 is a side view taken on line A—A of Figure 20; Figure 22 is an end view; Figure 23 is a cross section taken on line B—B of Figure 22; Figure 24 is a side view taken on the line C—C of Figure 20; and Figure 25 is a side view taken on line D—D of Figure 20.

The four number wheels 301, 302, 303 and 304 indicate the accumulated amount. These wheels rotate on shaft 306 which extends across frame 305. Each of the wheels 301, 302, 303 and 304 have two ratchet wheels 307 and 308, a ratchet bar separator disk 309, a gear wheel 310, and a tens carry disc 311, permanently attached thereto as a unit. Each of these wheel groups is held clear of the frame and adjacent wheel groups by collars 313, 314, 315, 316 and 317 which are attached to shaft 306 by set screws. Each wheel group carries a limit control lift 318. These lifts are mounted over their respective collars 313, 314, 315 and 316. Washers 319 are provided to permit limit control lifts 318 to be moved manually to a desired position on the tens carry discs 311. Springs 320 press against and hold the lifts 318 in engagement with the holes 321 manually selected in the tens carry discs 311. After being manually set in their respective holes 321 the lifts 318 thereafter rotate with their number wheels. Each gear plate 310 has twenty teeth 310a, two for each numeral from 0 to 9 on the number wheels. Each tens carry disc 311 carries but two gear teeth 311a for a carry-over function. Between wheel groups 301, 302, 303 and 304 are idling gears 322 each of which is in mesh with gear teeth 310a on its associated gear plate 310. These idling gears 322 are carried on a shaft 323 and are held in place by sleeves 324 on shaft 323. In order to pull these idling gears out of engagement for the resetting of indicator wheels 301, 302, 303 and 304, the ends of shaft 323 are carried in slots 325 in frame 305 (shown dotted in Figure 22). Springs 326 anchored on pins 327 normally hold the idling gears in engagement with their respective gear plates 310.

As shown, all wheel groups are at zero setting. When any wheel group (except wheel group 301) has completed an operation thru numerals "1" to "9" and is returning to "0" its tens carry disc gear teeth 311a engage an idling gear 322 revolving it sufficiently to cause an additional numeral to be carried into view by the adjacent number wheel due to the gear plate 310 of the adjacent wheel group being engaged with its associated idling gear 322. This arrangement provides a carry-over from one denomination to the next higher denomination.

As shown, the limit control lifts 318 are set at a point between numerals 2 and 3 of all wheel groups, but when in use these lifts are manually set in a particular position on the desired number wheel in order to control the charge limit established for the corresponding customer. These lifts are provided for operating charge limit control contacts which can be provided at the proper denomination number wheel in accordance with an established credit. No contacts are shown in Figures 21, 22 and 23 but in Figures 20 and 24 they are shown as credit limit control springs 330 associated with wheel groups 301 and 302. It will be seen that the contact carrier spring 331 (Figure 24) is resting on lift 318 and that the contacts are open. Lip 332, prior to engagement by lift 318 with spring 331, was resting against the edge of bracket 334 and lip 333 was resting on bracket 334 while contacts 330 were closed. Lift 318 on revolving into engagement with spring 331 causes spring 331 to rise, the contacts 330 to open, the lip 332 to be raised to the position shown in Figure 24 on top of bracket 334, and lip 333 to be lifted clear of bracket 334. Lip 333 is provided to permit manual operation of the contacts to their closed position after manually resetting the register. The contacts 330 are thereby maintained closed until the allowed credit is exceeded. Bracket 335 secured to frame 305 supports the contacts.

While Fig. 20 shows two sets of springs 330, one for the tens dollar wheel and one for the dollar wheel, only one of these sets of springs would be used on any one register. In case the springs are associated with the tens dollar wheel then the credit limit would be in tens of dollars, such as 10, 20, 30, etc. dollars. In case the springs are associated with the dollar wheel then the credit limit would be in dollars up to nine dollars.

Provision is made in the charge accumulating equipment, or customer's register, for operations in two directions; one to debit the customer and the other to credit the customer. The number wheels 301, 302, 303 and 304 are operated in a debit or adding direction by ratchet wheels 308 and in a credit or subtracting direction by ratchet wheels 307. Three magnets 336, 337 and 338 are shown for controlling the register. Magnet 336 controls the step-over from one digit to another by operation of the control drum 342 for sequentially associating the ratchet stepping bars of the number wheels with their respective ratchet wheels to sequentially condition such number wheels for operation. Magnet 337 pulses the number wheels as determined by the respective settings of the control drum 342 which determines which ratchet stepping bars are operatively effective for operating their associated number wheels. Magnet 338 controls the positioning of the ratchet stepping bars, or determine whether the adding (debiting) or subtracting ratchet stepping bars are to be effective to operate the number wheels.

In the transmitter each time a transmission is made from a sales position, or a credit position, a step-over pulse is transmitted to magnet 336 after each registered denomination digit is transmitted. That is, a step-over pulse is always transmitted after the "tens dollar" digit pulses are transmitted, after the "one dollar" digit pulses are transmitted, after the "tens cents" digit pulses are transmitted, and after the "cents" digit pulses are transmitted. In case no "tens dollar" digit pulses are to be transmitted the step-over pulse is transmitted nevertheless to condition the ratchet stepping pawls for the next denomination or for the "dollar" digit pulses so as to operate the "dollars" number wheel. The same is true for any denomination in order to properly prepare the correct number wheel for operation. Each time a step-over pulse is transmitted, step-over magnet 336 operates momentarily by attracting its armature 339 to which ratchet bar 340 is attached. Ratchet bar 340 engages the ratchet wheel 341 (Figure 24) to rotate the step-over control drum 342. Drum 342 carries lifts 343, 344, 345, 346, 347, 348, 349 and 350 to sequentially control the positioning of the ratchet stepping bars and ratchet stop bars so that such bars are sequentially effective as the drum 342 is rotated. The transmitter first transmits the "tens dollars" value set up, then transmits a step-over pulse. The transmitter next transmits the "dollars" value pulses followed by a step-over pulse, the "tens cents" value pulses followed by another step-over pulse, and then the "cents" value pulses followed by a further step-over pulse. The last step-over pulse reconditions the customer's register for a new registration. It will be noted that the lifts 349 and 345 of control drum 342 in its normal setting do not extend as far as the adding ratchet stepping bar 363 and stop bar 362 with the result that these bars are normally in position to effectively operate the number wheel 301 when magnet 337 is pulsed. Magnet 337, in receipt of its first series of pulses for the "tens dollar" digit, operates stepping pawl 363 to in turn engage and operate ratchet wheel 308 of the "tens dollar" number wheel 301. The "tens dollar" number wheel 301 is accordingly operated a number of steps corresponding to the number of "tens dollar" pulses transmitted to magnet 337. Magnet 337 has its armature 369 attached to arms 370 which are connected to rod 371 over which sleeves 372 hold the various ratcheting arms in place. As magnet 337 pulses, rods 371 slide back and forth in slots 373 (Figure 20) in frame 305 and are returned by springs 374 when the magnet de-energizes. Each ratcheting arm is attached to this rod 371 so while magnet 337 is pulsing four adding ratchet stepping arms and stops and four subtracting ratchet stepping arms and stops are moving back and forth in accordance with the number of pulses received by magnet 337. As but one of these sets of ratchet stepping arms and stops is in engagement with its associated ratchet wheel and number wheel at a time, due to the control of the lifts on step-over drum 342, only one number wheel is operated.

It will be noted that drum 342 has eight positions one of which is a normal position and eight lifts 343, 344, 345, 346, 347, 348, 349 and 350. Lift 349 is diametrically opposite lift 345, lift 350 is diametrically opposite lift 346, lift 343 is diametrically opposite lift 347 and lift 344 is diametrically opposite 348. Lifts 349 and 345 extend the same length on drum 342 and alternately control the ratchet stepping arms and stops. In normal position lift 349 raises stops 364, 366 and 368 while lift 345 lowers stepping arms 365, 367 and 369 thereby leaving only stops 362 and arm 363 effective for rotating number wheel 301. After rotation of drum 342 four steps, or half-way from its normal position, then drum 342 is in a position corresponding to its normal position where lift 349 lowers stepping arms 365, 367 and 369 and lift 345 raises stops 364, 366 and 368 again leaving stop 362 and arm 363 effective for rotating number wheel 301.

Lifts 348 and 344, as will be noted by referring to the two lifts 348 in Fig. 20, are divided. After the first rotary step of drum 342 lift 348 raises stops 362, 366 and 368 while lift 344 lowers stepping arms 363, 367 and 369 thereby leaving only stop 364 and arm 365 effective for rotating number wheel 302. After the drum 342 has rotated five steps then lift 348 lowers stepping arms 363, 367 and 369 while lift 344 raises stops 362, 366 and 368 thereby leaving only stop 364 and arm 365 again effective for rotating number wheel 302.

In a manner apparent to the foregoing just described the remaining lifts on drum 342 alternating control the stepping arms and stops to successively step the number wheels.

Ratchet adding stops 362, 364, 366 and 368 are pivoted on rod 389 and ratchet subtracting stops 390, 392, 394 and 396 are pivoted on rod 381. Both rods extend across the frame 305. These stops are provided to prevent the number wheels from turning back when the ratchet bars are returning to normal. Each ratchet stepping arm is attached to its associated stop by a spring 300 which pulls both into engagement with the ratchet wheel when permitted by the lifts on the step over drum 342.

When the step-over pulse, after the "tens dollar" transmission is received, magnet 336 operates its armature 339 and stepping pawl 340 to rotate step over drum 342 one step. The rotation of drum 342 causes lifts 348 and 344 to disengage ratchet stepping arm 363 and stop 362 from its associated ratchet wheel and number wheel thereby operating the stepping arm 363 and stop 362 to a position where they are ineffective to step number wheel 301 when magnet 337 is next pulsed. Also due to the rotation of drum 342 ratchet stepping arm 365 and stop 364, associated with the "dollars" number wheel 302, now rest on the body of drum 342 as the lifts 349 and 345 have been rotated out of engagement with arm 365 and stop 364. When magnet 337 is now pulsed in accordance with the transmission of the "dollar" pulses only ratchet stepping arm 365 and stop 364 are effective with the result that only the "dollars" wheel 302 is operated. The other ratchet stepping arms are ineffective at this time because the lifts 348 and 344 have positioned such arms out of working relation with their respective ratchet wheels. After transmission of the "dollar" pulses step over magnet 336 is again operated by a step over pulse to rotate drum 342 another step to position lifts 347 and 343 so as to disengage all ratchet stepping arms and stops except ratchet stepping arm 367 and stop 366 which now rest on the body of drum 342 in readiness to operate the "tens cent" number wheel 303. When magnet 337 is pulsed in accordance with the transmission of the "tens cents" pulses only ratchet stepping arm 367 and stop 366 are effective with the result that only the "tens cent" wheel 303 is operated. The other ratchet stepping arms are ineffective at this time because the lifts 347 and 343 have positioned such arms out of working relation with their respective ratchet wheels. After transmission of the "tens cents" pulses step over magnet 336 is again operated by a step over pulse to rotate drum 342 a further step to position lifts 346 and 350 so as to disengage all ratchet stepping arms and stops except ratchet stepping arm 369 and stop 368 which now rest on the body of drum 342 in readiness to operate the "cents" number wheel 304. When magnet 337 is pulsed in accordance with the transmission of the "cents" pulses only ratchet stepping arm 369 and stop 368 are effective with the result that only the "cents" wheel 304 is operated. The other ratchet stepping arms are ineffective at this time because the lifts 346 and 350 have positioned such arms out of working relation with their respective ratchet wheels. After transmission of the "cents" pulses step over magnet 336 is again operated to rotate drum 342 in its fourth step thereby rotating drum 342 halfway back to its normal position where lifts 349 and 345 are again effective to disengage all ratchet stepping arms and stops except ratchet stepping arm 363 and stop 362 which now rest on the body of drum 342 in readiness to operate the "tens dollar" number wheel 301 for a new registration.

Magnet 338 is provided to control the subtracting, or credit, operation of the customer's register, or charge accumulating equipment. When magnet 338 is normal the four subtracting ratchet stepping arms 391, 393, 395 and 397 and corresponding stops 390, 392, 394 and 396 are all held clear of their respective ratchets 307 by rods 355 and 354. When magnet 338 is operated the subtracting ratchet stepping arms 391, 393, 395 and 397 and associated stops 390, 392, 394 and 396 are made operative while the adding ratchet stepping arms 363, 365, 367 and 369 and associated stops 362, 364, 366 and 368 are all held clear of their respective ratchet wheels. The changeover from adding to subtracting is accomplished as follows: Bar 352 is attached to armature 351 and to lifting arms 353 which carry rods 354 and 355. Rods 356 and 357 are stops inserted in frame 305 (Figure 20) to limit the movement of rods 354 and 355. Normally the subtracting ratchet stepping arms 391, 393, 395 and 397 and stops 390, 392, 394 and 396 rest on rods 354 and 355 which hold them clear of the number wheel ratchet wheels. When magnet 338 is operated for a subtracting entry, armature 351 operates arm 352 to rotate arms 353 on shaft 358 which extends across frame 305. The movement of arms 353 cause rods 355 and 354 to enter recesses 382 and 383 (Figure 21) in the subtracting ratchet stepping arms 391, 393, 395 and 397 and their stops 390, 392, 394 and 396 thereby permitting these arms and stops to fall into operative position. Rods 354 and 355 in changing position also cause all adding ratchet stepping arms 363, 365, 367 and 369 and their stops 362, 364, 366 and 368 to move to a nonoperative position where they are ineffectively operated by magnet 337 when such magnet is pulsed to establish credit on the customer's register. The subtracting ratchet stepping arms 391, 393, 395 and 397 and their stops 390, 392, 394 and 396 are sequentially rendered effective by the lifts on drum 342 in the same manner as described for the adding stepping arms and stops. In this case the ratchet stepping arms engage and operate the ratchet wheels 387 of the number wheels to rotate the number wheels in a reverse, or subtracting, direction. When magnet 338 is released, the normal, or adding, condition is reestablished by return of armature 351. The numerals on the number wheels are shown raised to permit a printing operation if such operation is desired.

*Circuit drawing*

Having described the mechanical constructions of the transmitting unit and customer's register a brief description will be given of the apparatus included in the circuit diagrams. Figure 26 diagrammatically represents the circuit connections and mechanism associated with one of the transmitting units. This figure may be termed a "functional diagram" in that the mechanism of the transmitter has been laid out so as to more easily describe the operation of the mechanism in connection with the circuits controlled thereby. In this figure the same reference characters, as applied to the mechanical drawings, relate to the same apparatus although the shape of the apparatus in the "functional diagram" may be slightly changed or extended in order to more clearly show and describe the functions performed. The dial, or calling device 17, is of the well-known type of calling device used in automatic telephone systems except that its impulsing springs are normally open and are closed to transmit pulses. The credit key 19 is also of the well-known locking type of telephone key and is provided at a transmitter to enable the transmission of credit pulses instead of debit pulses. The remainder of the apparatus in this figure is shown in the mechanical drawings of the transmitting unit. Thruout these circuit drawings ground and battery symbols are designated at different places in the circuit diagrams but it will be understood that there is but one common battery having one of its poles grounded and that wire connections extend from this common battery to all such battery and ground designated symbols.

The reference characters LS and LS1 designate the well-known rotary type of line switch commonly used in telephone systems and having a motor magnet for stepping the line switch wipers in a rotary direction. In addition these line switches have a slow to release hold relay and a switching relay. The wipers of these switches remain in the position last used and have access to a series of bank contacts connected to a group of selectors, such as selector S1.

The line switch LS is individual to the transmitter shown in Figure 26 while the line switch LS1 is individual to the credit position shown dotted in this drawing. The selector S1 is mechanically similar to the well-known Strowger vertical and rotary switch commonly used in automatic telephone systems. These switches are shown and described on pages 11–29 of the publication entitled "Principles of Automatic Telephony, Circuits and Trunking" by Harry P. Mahoney. The selectors have a vertical magnet for directively operating the wiper shaft and wipers in a vertical direction to a desired level of bank contacts and have a rotary magnet for thereafter rotating the shaft and wipers to automatically select an idle outlet leading to another selector switch or connector switch dependent upon its location in the switch train. Each selector has a release magnet for restoring the shaft and wipers to normal. Each selector has off-normal springs designated ON which operate on the first vertical step of the switch shaft and a pair of cam springs 457 which close in case the wipers are rotated off the bank contacts when no idle outlets are available, or when all trunks on the level are busy. A slow-to-release change-over relay, indicated by the cross-hatching in the lower portion of the relay, is provided to control the change-over from the vertical to the rotary movement. A stepping relay in each selector controls the automatic rotary movement and a two-step hold and switching relay holds and switches the connections thru to the next selected switch. These two step relays operate only their contacts designated I on their first step and the contacts designated II on their second step. The selectors, such as S1, have access to ten groups of second selectors, such as the selector designated S2. The second selectors are similar to the first selectors, such as selectors S1, and have access to groups of third selectors, such as S3. The third selectors are similar to the first selectors and have access to Strowger vertical and rotary connector switches such as connector C, also commonly used in automatic telephone systems.

The "credit position," shown dotted in Figure 27, is provided to permit connection with and operate a customer's register to either credit or debit such customer. An "OK lamp" 481 and a "busy lamp" 482 are provided at this position. The "OK lamp" is provided to indicate that a customer has not exceeded his charge limit, while the "busy lamp" is provided to provide an indication when a customer's register cannot be reached due to an all trunk busy condition. A pulse calling device 17B and a select calling device 17A are provided at this position. These calling devices are similar to the calling device 17 shown in Figure 26. Calling device 17A is used to operate the selector and connector switches to select the desired customer's charge register while the calling device 17B is used to operate the register to debit or credit the customer's account dependent upon the non-operated or operated condition of the "credit key" 486. A "step over key" 485 is provided to control the step over from one number wheel to the next in the selected customer's register.

The connector switch C, shown in Figure 28, is of the well-known Strowger telephone type of switch having directive vertical and directive rotary movement of its shaft and wipers to select a particular one out of one hundred terminals. The connectors, like the selectors, have vertical, rotary and release magnets for controlling the operation and release of the switch shaft and wipers. Each connector has a slow-to-release hold relay, a slow-to-release change-over relay, a pair of two-step transfer relays, and a pair of off-normal contacts which are operated on the first vertical step of the wipers. The connector wipers have access to one hundred sets of bank contacts which are cross connected to customer's individual registers or terminals as shown in Figure 29.

Figure 29 shows two of the individual customer's registers, the upper one of which has not exceeded the credit limit established while the lower one has either exceeded his credit limit or the credit has been manually removed by operation of spring 333' to the position shown. Those customers which have unlimited accounts do not have any individual registers and have their OK bank terminal permanently connected to battery potential. Other customers which require each charge purchase to be approved by some store credit official have no individual registers and no connections as indicated by the four uppermost terminals 100 in Figure 29. The dotted portion in Figure 29 is provided for the purpose of signalling some store official when the sales clerk is aware of the fact that some fraudulent charge is being attempted. In a case of fraud the sales clerk dials the number corresponding to her sales position to signal the store official. This signalling equipment comprises a relay which operates and locks to a release key K, a lamp L individual to the sales position and a common alarm A.

Figure 30 shows a one-line diagram of the entire system. All of the sales positions have individual transmitters and the credit position may be similar to the sales position transmitters or may have a position such as indicated in the dotted portion of Figure 27. Each position is connected to an individual line switch, such as LS or LS1, which has access to a group of first selectors, such as S1. The first selectors S1 have access to ten groups of second selectors S2 while each group of second selectors have access to ten groups of third selectors S3. Each group of selectors has access to ten groups of connectors C which in turn have access to the bank contacts corresponding to the customer's number. As will be seen the system is based on a decimal system having five digits for selecting a desired customer's register and, therefore, is known as a hundred-thousand line system. Most of these line terminals would be assigned customer's numbers while the remaining terminals may be unused or used for special purposes such as fraudulent signalling.

Operation and circuit description

In order to explain the detail operations it will be assumed that John L. Doe, 1300 Main Street, Anytown, New York, desires to make a charge purchase amounting to $6.95 and that he has presented his credit plate to the sales person. The sales person prepares the sales check as required for the $6.95 purchase but omits the name and address. The customer's credit plate is placed in tray 18 in the location provided at 22 and the sales check is placed in tray 18 with its upper end against bar 23 (Figure 26). The sales person now establishes the amount of the sale $6.95 in the windows 13, 14, 15 and 16 by first moving lever 25 until the numeral "6" appears in window 14, by then moving lever 26 until the numeral "9" appears in window 15, and by moving lever 27 until numeral "5" appears in window 16. In response to moving lever 25, the operating plate 36 was also moved in the same direction thereby causing operation of the off-normal bar 39 which causes contacts 20 and 21 to close. The closure of contacts 21 causes the operation of the rotary line switch LS in Figure 27 to start operation in search of an idle trunk preparatory to routing the call to the charge accumulating apparatus as will be described more fully hereinafter. As previously described, in connection with the detail mechanical description of the transmitter, it will be remembered that the manual operation of any one lever and its associated operating plate caused all remaining levers and their operating plates to move to an off-normal position where such levers are locked until manually moved and that the restoring plates, such as 73, 74, 75 and 76, are likewise moved against their stops 77, 78, 79 and 80 to cause the lifts 85 to clear the slots 90 to permit the levers to be locked in their operated off-normal positions and to cause lifts 107, 108, 109 and 110 to move gears 102, 103, 104 and 105 out of mesh with the gear teeth on the operating plates 35, 36, 37 and 38. The movement of the lever 27 to its off-normal position causes the stop 99 to be positioned in order to lock the sending bar 100, when it is operated, in operated position.

The sales person next operates lever 26 from its locked off-normal position by first depressing spring 97 to unlock the lever and then moving it and its associated operating plate 37 until the numeral "9" appears in window 15 and thereafter operates lever 27 and its associated operating plate 38 in a similar manner until the numeral "5" appears in window 16. The amount $6.95 has now been registered in the transmitter by the automatic movement of lever 24 and operating plate 35 to its off-normal position, by the manual movement of lever 25 and plate 36 to display numeral "6," by the manual movement of lever 26 and operating plate 37 to display numeral "9" and by the manual movement of lever 27 and operating plate 38 to display numeral "5." During this movement of operating plates 35, 36, 37 and 38 to their respective set positions, lifts 30 on such operating plates caused each of the stepover contacts 131, 132, 133 and 134 to be operated once. Also the manual operation of levers 25, 26, and 27 caused lifts 30 on operating plates 36, 37 and 38 to operate pulsing contacts 136, 137 and 138 to be operated in accordance with the numerals displayed. The operation of the stepover and pulsing contacts at this time are ineffective because the step-over and pulsing circuits are open at contacts 4 of spring set 155.

During the time the sales person is establishing the amount to be transmitted the line switch LS in Figure 27 will have selected an idle trunk leading to one of the first selectors. The lineswitch LS is started in operation as soon as contacts 21 are closed by off-normal bar 39. The circuit for initiating the operation of lineswitch LS may be traced as follows: From grounded contacts 21, conductor 403, and thru the winding of slow-to-release hold relay 410 to battery. Hold relay 410 energizes over this circuit and at contacts 411 prepares a circuit for switching relay 420 while at contacts 412 prepares a circuit for stepping magnet 414. The operation of lineswitch LS is now dependent upon whether test wiper 433 is in engagement with a bank contact terminating a multiple of a busy first selector. If such first selector is busy in a prior selection, ground potential will be applied to the bank contact engaged by test wiper 433 to short circuit switching relay 420 and to cause the operation of stepping magnet 414. The circuit for short circuiting relay 420 extends from the grounded bank contact engaged by test wiper 433, armature 423 and its back contact, contacts 412, and thru the winding of relay 420 to ground at contacts 411 of relay 410. The circuit for operating stepping magnet 414 extends from the grounded test wiper 433 over the previously traced circuit and then by way of interrupter contacts 413 thru the winding of magnet 414 to battery. Magnet 414 operates its armature and pawl preparatory to stepping the wipers 431 to 435. Near the end of the armature stroke interrupter springs 413 operate and open the circuit to magnet 414 which deenergizes to step the wipers one step and to reclose interrupter springs 413. If test wiper 433 on this step engages another grounded bank contact relay 420 is again short circuited and magnet 414 again steps the wipers another step. This operation continues until test wiper 433 engages a bank contact having battery potential therein instead of a grounded busy contact. In case the wipers of the lineswitch were resting on the multiples of an idle first selector, the lineswitch would immediately switch thru to such selector without rotating its wipers. Assuming now that first selector S1 is the first idle selector engaged by test wiper 433, relay 420 now energizes since it is no longer short-circuited. The circuit for energizing relay 420 may be traced as follows: from ground at contacts 411, winding of relay 420, interrupter contacts 413, and thru the winding of stepping magnet 414 to battery. Switching relay 420 energizes in this circuit but magnet 414 is marginal and does not energize in series with the high resistance winding of relay 420. At back contacts 423, relay 420, opens the circuit to stepping magnet 414 and at front contacts 423 connects ground to test wiper 433 to busy this trunk and to cause the operation of two-step relay 440 in its first step. At contacts 421, 422, 424 and 425 relay 420 operatively connects the transmitter to first selector S1. The circuit for operating two-step relay 440 in its first step may be traced as follows: from ground at contacts 411, front contact and armature 423, test wiper 433, contacts 446, and thru the upper winding of relay 440 to battery. Relay 440 is operated in only its first step over this circuit and operates only contacts 447, marked with a Roman numeral I, to open the circuit to selector release magnet 454 at its back contacts and to prepare the stepping circuits for the selector at its front contacts.

The sales person now operates dial 17 (Figure 26) in accordance with the customer's code number which is JLD-13. In response to dialling the letter J, the impulse springs of the dial close four times to transmit the digit 4. Each time the dial impulse springs close a circuit may be traced for operating slow-to-release change-over relay 450 and the selector vertical magnet in series as follows: from ground at contacts 443, selector bank contact and wiper 432, contacts 422, conductor 402, dial impulse springs of dial 17, conductor 404, contacts 424, selector wiper 434 and its engaged bank contact, contacts 449, and thru the windings of change-over relay 450 and vertical magnet 453 to battery. The selector vertical magnet 453 in the well-known manner operates the selector shaft and wipers one vertical step for each impulse received and in this case, since the digit 4 is the digit transmitted, the wipers are stepped vertically opposite the fourth level of selector bank contacts. The off-normal springs 463 close on the first vertical step of the selection shaft to prepare a circuit for the selector release magnet 454 and off-normal springs 464 also close on the first vertical step to complete a circuit for operating step relay 460. Change-over relay 450 energizes in series with the vertical magnet and due to its slow-to-release characteristics, indicated by cross-hatching, remains in energized position during the series of pulses comprising this digit. At contacts 451 relay 450 completes the circuit for energizing step relay 460 and at contacts 452 opens a point in the circuit to the selector rotary magnet. The circuit for energizing relay 460 may be traced as follows: from ground at front contacts and armature 447, contacts 451, off-normal contacts 464, and thru the winding of relay 460 to battery. At contacts 461 relay 460 completes a short circuit around the lower winding of relay 440 and also completes a locking circuit for itself. The short circuit thru the lower winding of relay 440 extends from ground at contacts 411, front contacts 423, wiper 433, lower winding of relay 440, contacts 461 to ground at front contacts of armature 447. The locking circuit for relay 460 extends from ground at armature 447, contacts 461, interrupter contacts 467 of rotary magnet 465, off-normal contacts 464, and thru the winding of relay 460 to battery.

Shortly after transmitting the last pulse of the series slow-to-release change-over relay 450 deenergizes to open the original energizing circuit of relay 460 which is now locked energized and to complete the circuit to rotary magnet 465 to rotate the shaft and wipers into engagement with the first set of bank contacts in the fourth level. The circuit for operating rotary magnet 465 extends from ground at contacts 447, contacts 452, contacts 462 and thru the winding of rotary magnet 465 to battery. Rotary magnet 465 in the well-known manner rotates the shaft and wipers into engagement with the first set of bank contacts in the fourth level and near the end of its stroke opens interrupter contacts 467 to open the locking circuit of step relay 460 which deenergizes. Relay 460 at contacts 461 opens the previously traced short circuit for the lowering winding of relay 440 as well as opening a point in its own locking circuit. At contacts 462 relay 460 opens the circuit to rotary magnet 465 which deenergizes to close its interrupter contacts 467.

The operation of selector S1 at this point is now dependent upon whether test wiper 473 engages a grounded test contact. If selector S2 is busy, the bank contact engaged by wiper 473 is grounded thereby short-circuiting the lower winding of relay 440 as well as completing an operating circuit for step relay 460. This short circuit extends from grounded bank contact engaged by test wiper 473, contacts 444, contacts 456, lower winding of relay 440 to ground at contacts 411. The circuit for energizing step relay 460 extends from this same grounded bank contact, wiper 473, contacts 444, 456 and 467, off-normal contacts 464 and thru the winding of step relay 460 to battery. Relay 460 at contacts 461 again completes its locking circuit and at contacts 462 again completes the circuit to rotary magnet 465. Rotary magnet 465 again steps the shaft and wipers another rotary step and interrupts the circuit of relay 460 which deenergizes. If the next selector in this level is busy relay 440 is again short circuited and relay 460 is again energized to cause the rotary magnet to rotate the wipers another step. This operation continues until wiper 473 engages a non-grounded bank contact designating an idle selector, or, if all the selectors in this level are busy the wipers will rotate off of the last bank contact at which time the eleventh position cam springs 457 are operated. The closure of cam springs 457 completes a circuit for lighting the busy lamp 8 to indicate to the sales person that all trunk outlets leading to the customer's register are busy and that another attempt must be made.

Assuming now that the first idle selector encountered is selector S2, then, since no ground is encountered by test wiper 473, no circuit is completed for step relay 460 and the lower winding of relay 440 is no longer short circuited. A circuit for energizing relay 440 thru its second step may now be traced as follows: from ground at contacts 411, front contacts 423, wiper 433, lower winding of relay 440, interrupter contacts 467, off-normal contacts 464 and thru the winding of relay 460 to battery. Relay 440 fully energizes in this circuit to operate its second step contacts, indicated with Roman numerals II, but relay 460 is marginal and will not energize in series with the high resistance lower winding of relay 440. Relay 440 at contacts 441 switches the OK lead 401 thru to the second selector S2, at contacts 443 disconnects ground, at contacts 442 switches the pulsing lead 402 to selector S2, at contacts 449 disconnects relay 450 and magnet 453 from lead 404, at contacts 448 switches lead 404 to selector S2, at contacts 455 switches the credit lead 405 to selector S2, at contacts 446 opens the circuit to the upper winding of relay 440 which is now held energized thru its lower winding, at contacts 444 opens a point in the circuit to relay 460, and contacts 445 completes a circuit for energizing the hold and switching relay in selector S2 thru its upper winding to operate only its first step contacts. The hold and switching relay in selector S2 is identical to the hold and switching relay 440 in selector S1; in fact, selector S2 is identical in all respects to selector S1. The circuit for energizing the hold and switching relay in selector S2 extends from ground at contacts 411, front contacts 423, wiper 433, contacts 445, wiper 473 and thru the upper winding of the hold and switching relay in selector S2 to battery. The pulsing circuit to the vertical magnet and change-over relay in selector S2 are now closed over wipers 472 and 474.

In response to the sales person dialling the next code digit, in this case code letter L or digit 4, the selector S2 is operated in the same manner as described for selector S1 to select an idle third selector, such as selector S3. In response to dialling the following code letter D, or digit 2, the selector S3 operates its wipers to the second level and then rotates such wipers in search of an idle connector switch, such as connector C, in the same manner as described for selector S1.

Assuming now that the connector C (Figure 28) is the connector switch seized by selector S3, a circuit for energizing slow-to-release hold relay 510 is completed as follows: from grounded contacts 411, contacts 423, wiper 433, contacts 445, wiper 473, contacts in selector S2 similar to contacts 445, wiper 493, contacts in selector S3 similar to contacts 445, wiper 503 and thru the winding of relay 510 to battery. Slow-to-release relay 510 energizes over this circuit and at contacts 511 prepares locking circuits to the two-step transfer relays 530 and 540, and at contacts 512 opens a point in the circuit to the release magnet 529.

In response to the sales person dialling the next code digit, in this case digit 1, a single pulse is transmitted to slow-to-release change-over relay 520 and vertical magnet 538 over the following circuit: from ground at contacts 543, bank contact and wiper 502 switching contacts in selector S3 to the bank contact and wiper 492, switching contacts in selector S2 to the bank contact and wiper 472, switching contacts 442 in selector S1, bank contact and wiper 432, contacts 422, conductor 402, impulse springs in dial 17, conductor 404, contacts 424, wiper 434 and bank contact, switching contacts 448 in selector S1, wiper 474 and bank contact, switching contacts in selector S2, wiper 494 and bank contact, switching contacts in selector S3, wiper 504 and bank contact, contacts 548, winding of slow-to-release change-over relay 520, back contacts 533, and thru the winding of vertical magnet 538 to battery. Relay 520 and magnet 538 operate in series over this circuit. Relay 520 at contacts 521 completes a circuit by way of back contacts 532 thru the lower winding of transfer relay 530 for energizing relay 530 in its first step to close only contacts 531. Relays 530 and 540 are two step relays which operate only their first step contacts, indicated by Roman numeral I, when their lower windings alone are energized and which are fully energized to operate their remaining contacts when their upper windings are energized in series with their lower windings. Relay 530, upon energizing in its first step, operates contacts 531 only thereby closing a short circuit thru its upper winding as follows: from ground at contacts 511, contacts 531, upper winding of relay 530, back contacts 532, to ground at contacts 521. Relay 530 will not fully operate as long as its upper winding is short-circuited. Vertical magnet 538 operates to raise the shaft and wipers one vertical step for each impulse received and since, in this case, only one impulse was received the connector wipers are raised opposite the first level of bank contacts. Off-normal springs 528 close on the first vertical step of the shaft to prepare a circuit for the connector release magnet 529.

Shortly after the first digit transmitted to the connector slow-to-release relay 520 deenergizes to remove at contacts 521 the short circuit from the upper winding of transfer relay 530. The two windings of relay 530 are now energized in series thru contacts 531 to ground at contacts 511 with fore six of the lifts 30 on plate 36 had passed under pulse springs 136. In response to the return to normal of plate 36 these six lifts 30 operate pulse springs 136 six times to transmit six pulses to pulse magnet 337 over the following circuit: from ground at contacts 4, conductor 407, pulse contacts 136, conductor 402, contacts 422, wiper 432, contacts 442, wipers 472, 492 and 502, contacts 542, wiper 552, bank contact 662, conductor 672, terminals 682 and 691 and thru the winding of pulse magnet 337 to battery. Magnet 337 operates the present ratchet stepping arm and stop associated with the "dollars" number wheel, as previously described, to step the "dollars" number wheel six steps to add this amount to any previously registered dollars in the register. Shortly after the transmission of the last "dollar" pulse the last or upper lift 30 on operating plate 36 operates step-over contacts 132 to transmit a pulse over the step-over circuit to step-over magnet 336. The step-over circuit is the same as that previously traced except that step-over contact 132, instead of contact 131, is now included in the circuit.

The operation of step-over magnet 336 steps drum 342 to render ineffective the ratchet stepping arm and stops associated with the "dollars" number wheel and positions the ratchet stepping arm and stop associated with the "tens cents" number wheel in readiness to operate this number wheel in the manner aparent from the foregoing description.

When lever 25 returned to its normal position lip 66 on lever 25 engaged lip 161 to compress spring 71 and restore restoring plate 75 to its normal position. The lifts 85 on restoring plate 75 cause the ejection of lip 93 from slots 90 in fixed plate 88 to thereby permit spring 33 to restore lever 26 and operating plate 37 to normal. Lift 109 on plate 75 causes gear 104 to mesh with teeth 113 in operating plate 37 to thereby control the return speed of plate 37 and lever 26. Lever 26 and plate 37 were operated to display numeral "9" in window 15 and therefore nine lifts 30 on plate 37 had passed under pulse spring 137. In response to the return to normal of plate 37 these nine lifts 30 operate pulse springs 137 nine times to transmit nine ground pulses to pulse magnet 337 over the pulsing circuit. This pulsing circuit is the same as that previously traced except that pulse springs 137, instead of pulse springs 136, do the pulsing. Magnet 337 operates the preset ratchet stepping arm and stop associated with the "tens cents" number wheel to step such wheel nine steps to add this amount to any previous registrations in the manner previously described.

Shortly after the transmission of the last "tens cents" pulse the last or upper lift 30 on plate 37 operates stepover contacts 133 to transmit a ground pulse over the previously traced stepover circuit to step-over magnet 336.

The operation of the step-over magnet 336 steps drum 342 to render ineffective the ratchet stepping arm and stop associated with the "tens cents" number wheel and positions the ratchet stepping arm and stop associated with the "cents" number wheel in readiness to operate this wheel.

When lever 26 returned to normal lip 67 on lever 25 engaged lip 162 to compress spring 72 and restore restoring plate 76 to its normal position. The lifts 85 on plate 76 eject lip 94 from slots 90 in fixed plate 89 to thereby permit spring 34 to restore lever 27 and operating plate 38 to normal. Lift 110 on plate 76 causes gear 105 to mesh with the teeth 114 in operating plate 38 to control the return speed of plate 38 and lever 27. Lever 27 and plate 38 were operated to display the numeral "5" in window 16 and therefore five lifts 30 had passed under pulse springs 138. In response to the return to normal of plate 38 these five lifts 30 operate pulse springs 138 five times to transmit five ground pulses over the previously traced pulse circuit to pulse magnet 337. Magnet 337 operates the preset ratchet stepping arm and stop associated with the "cents" number wheel to step such wheel five steps to add this amount to any previous registration. Any carry-over from one denomination to the next is mechanically controlled as described in connection with the mechanical description of the customer's register.

Shortly after the transmission of the last "cents" pulse, the last or upper lift 30 on plate 38 operates step-over contacts 134. The left-hand set of contacts 134 transmits a ground pulse over the previously traced step-over circuit to step-over magnet 336. Step-over magnet 336 rotates drum 342 half-way to its normal position thereby rendering the ratchet stepping arm and stop associated with the "cents" number wheel, ineffective while positioning the ratchet stepping arm and stop associated with the "tens dollar" number wheel in readiness for operating such wheel in response to a new charge registration. The customer's register has now added the amount of $6.95 to any previous registrations in the register.

In case the total registrations in the customer's register does not exceed the credit limit established for this customer the approval contacts 330 are still closed with the result that the approval source of current, or battery, is connected to the customer's individual terminal. When step-over contacts 134 were closed by the last lift 30 on operating plate 38, a circuit may be traced thru the right-hand contacts of step-over contact set 134 for operating the OK magnet 142 to print an OK indication on the sales check in tray 18. This circuit may be traced as follows: from ground thru the windings of OK magnet 142, conductor 409, contacts 5 controlled by lift 154 of sending arm 106, right-hand pair of step-over contacts 134, over the OK conductor 401, contacts 421, wiper 431, contacts 441, wipers 471, 491 and 501, contacts 541, wiper 551, bank contact 661, conductor 671, customer's individual terminal 681, terminal 693, and thru the closed approval contacts 330 to battery.

In case the last transmitted amount to the customer's register causes the accumulative total therein to exceed the credit limit established for such a customer then the approval source of current is disconnected from the customer's individual terminal 681 by the operation of spring 331 to open contacts 330 as previously described in the mechanical description. In this case no circuit is completed for operating the OK magnet 142 with the result that the sales check will not have printed thereon an OK indication. The absences of an approval indication on the sales check informs the sales person that some credit official should be consulted before the customer can make the desired charge purchase.

Returning now to the operation of the transmitter during the restoration of lever 27 and operating plate 38 to normal, lip 68 on lever 27 engages lift 163 on stop 99 causing stop 99 to move to the right (as seen in Figure 26) to disengage 99A from lift 153 thereby unlocking the the result that relay 530 now fully energizes to operate its second step contacts 532 and 533. At contacts 532 relay 530 prepares the circuit to relay 540 and at contacts 533 opens the circuit to vertical magnet 538 and prepares the circuit to rotary magnet 539. The connector switch is now ready to respond to the last digit of the code.

In response to the sales person dialling the last digit of the code, in this case the digit 3, the change-over relay 520 and rotary magnet 539 are operated in series over the pulsing circuit starting with ground at contacts 543 over the previously traced circuit including the impulsing contacts of dial 17 back thru the winding of change-over relay 520 and this time thru front contacts 533 and contacts 546 thru the winding of rotary magnet to battery. Change-over relay 520, due to its slow-to-release characteristics, maintains its armatures operated during transmission of the last digit. At contacts 521 relay 520 completes a circuit by way of front contacts 532 and contacts 545 for the lower winding of relay 540 to operate relay 540 in its first step to close only contacts 544. Relay 540 at contacts 544 completes a short circuit around its upper winding from ground at contacts 511 to ground at contacts 521. The rotary magnet 539, in response to the thru pulses of the last digit, rotates the connector wipers thru rotary steps into engagement with the bank contacts connected to this particular customer's individual account terminals which are cross connected to the customer's individual register. For example, it will be assumed that the customer's register, diagrammatically illustrated by magnets 337, 336 and 338 in the upper right hand corner of Figure 29, is the register connected to by connector wipers 551 to 554.

Shortly after the last impulse of the last digit, slow-to-release change-over relay deenergizes to remove the short circuit around the upper winding of transfer relay 540. Relay 540 now fully energizes since both its windings are energized in series from ground at contacts 511. At contacts 541 relay 540 switches the OK lead 401 thru to the contacts 330 controlling the connection of the approval source of current by way of wiper 551, bank contacts 661, conductor 671, terminals 681 and 693 and contacts 330. At contacts 543 relay 540 disconnects ground and at contacts 542 switches the pulse lead 402 thru to the pulse magnet 337 by way of wiper 552, bank contacts 662, conductor 672, and terminals 682 and 691. At contacts 546 relay 540 disconnects the change-over relay 520 and magnet 539 and at contacts 547 switches the step-over lead 404 thru to step-over magnet 336 by way of wiper 553, bank contact 663, conductor 673, and terminals 683 and 692. At contacts 548 relay 540 switches the credit lead 405 thru to the credit magnet 338 by way of wiper 554, bank contact 664, conductor 674 and terminals 684 and 694.

From the foregoing explanation it will be seen that in response to dialling the customer's code digits "JLD–13" an automatic switch train comprising selectors and a connector are operated to select the customer's individual account terminals and the customer's register.

Having dialed the customer's code number the sales person next pushes tray 18 inwards until it is stopped to cause the automatic transmission of the amount indicated on the transmitter to the customer's charge accumulating equipment, or register. When tray 18 is stopped the credit plate 22 will be immediately below printing magnet 140 and printing plate 141 will be under magnet 142. The inward movement of tray 18 causes lift 143A to operate sending key operating bar 143 which causes the sending key, or bar 100, to be moved inward by lift 144. The inward movement of bar 100 causes lift 145 to operate the tray locking bar 146. In operation, locking bar 146 moves toward guide bar 147 to cause locking bolt 148 to engage guide bar 147 and compress spring 149. Spring 149 remains compressed until the inward movement of tray 18 brings slot 150 into engagement with locking bolt 148. This engagement of bolt 148 in slot 150 holds tray 18 in an operated position until transmission is completed and lift 145 returns to normal. As sending bar 100 was impelled inward by lift 144 several operations took place. Lift 153 on sending arm 100 passed under stop 99A momentarily compressing spring 101 to lock arm 100 in operated position. Lift 154 passed under operating spring 155 to close contacts 4, 5 and 6 and open contacts 7. Lift 152 engages end 157 of arm 156 to rotate arm 156 and raise end 158. This movement causes the end 158 to engage lip 159 on restoring plate 73 associated with lever 24 to compress spring 69 and move plate 73 back to its normal position. The movement of restoring plate 73 to its normal position causes the lifts 85 to cover notches 90 in the fixed plate 86 thereby ejecting the lip 91 of lever 24 from a notch 90. Spring 31 is now effective to restore lever 24 and its associated operating plate 35 back to their normal positions. When restoring plate 73 was forced back to its normal position its governor gear lift 107 caused gear 102 to engage the gear teeth 111 in operating plate 35 thereby controlling the speed of return of operating plate 35 to assure proper operation of the pulsing contacts by lifts 30. Since, as previously described, operating plate 35 was only moved to an off-normal position none of the lifts 30 passed under contacts 135 during the manual key setting operations with the result that on the return to normal of plate 35 the impulse contacts 135 are not operated. Step-over contacts 131, however, are operated once during the return to normal of plate 35 to transmit a step-over pulse to operate step-over magnet 336 in the selected customer's register. This circuit may be traced as follows: from ground at contacts 4, conductor 407, step-over contacts 131, conductor 404, contacts 424, wiper 434, contacts 448, wiper 474, thru similar contacts in selectors S2 and S3, wipers 494 and 504, contacts 547, wiper 553, bank contact 663, conductor 673, terminals 683 and 692, and thru the winding of step-over magnet 336 to battery. The operation of step-over magnet 336 steps the drum 362, as previously described, to render ineffective the ratchet stepping arms and stops associated with the "tens dollar" number wheel and positions the ratchet stepping arms and stops associated with the "dollars" number wheel in readiness to operate the "dollars" number wheel.

When lever 24 returned to its normal position lip 65 on lever 24 engaged lip 160 to compress spring 70 and restore restoring plate 74 to its normal position. In the same manner as previously described lifts 85 on restoring plate 74 cause the ejection of lip 92 from slots 90 in fixed plate 87 to thereby permit spring 32 to restore lever 25 and operating plate 36 to normal. Movement of lift 108 causes gear 103 to engage teeth 112 in operating plate 36 to thereby control the return speed of plate 36 and lever 25. As will be remembered lever 25 and plate 36 were operated to display numeral "6" in window 14 and there-sending arm 100. Spring 164 now restores sending arm 100 to normal. In returning to normal sending arm 100 causes lift 145 to release locking bar 146, lift 154 to restore spring set 155, and tray 18 to be returned to open position. When tray 18 was first moved inward, credit plate 22 engaged pin 165 to compress spring 166 and close contacts 167 to complete an obvious circuit from battery at contacts 6 for operating printing magnet 140 to print the information on the credit plate 22 on the sales check. If no credit plate is used contacts 167 do not close and magnet 140 is not operated. In case only a printing operation with a credit plate is desired to print the name and address of a customer with an automatic credit verification, the tray 18 is operated without previously setting the transmitter keys or levers with the result that magnet 140 is operated by the closure of contacts 167 and the tray 18 is automatically restored since the stop 99 is not positioned to lock the tray in operated position.

When the last operating plate 38 is restored to normal position the off-normal bar 39 is returned to its normal position thereby opening contacts 20 and 21. In response to the opening of contacts 21 ground is removed from the start and hold conductor 403 thereby opening the circuit of start and hold relay 410. Relay 410, after an interval, deenergizes to disconnect the holding ground at armature 411 from the selector and connector switches to cause their release. Relay 420 in line switch LS, relay 440 in selector S1 and similar relays in selectors S2 and S3, and relay 510 all deenergize when relay 410 deenergizes. Relay 420 restores its contacts to the positions shown in the drawing and the wipers of the line switch remain in their last used position. Relay 440 in selector S1 restores its contacts to normal and at back contacts 447 completes a circuit thru off-normal contacts 463 for operating release magnet 454. The operation of release magnet 454 causes the shaft and wipers of selector S1 to restore to normal in the well-known manner. In addition release magnet 454 opens contacts 456 to prevent the operation of stepping relay 460 during the restoration of wiper 473 to normal. When the selector shaft is restored to normal the off-normal springs 464 and 463 open and the latter springs open the circuit to release magnet 454. The selectors S2 and S3 release in a similar manner. When relay 510 in connector C releases contacts 511 open the locking circuits of transfer relays 530 and 540 which restore. At contacts 512 relay 510 closes a circuit thru off-normal contacts 528 for operating release magnet 529 to release the connector shaft and wipers. When the connector shaft is restored off-normal contacts 528 open the circuit to release magnet 529 which also restores. The entire switch train is now released and may be used on subsequent connections.

Credit transmission

Some of the sales position transmitters may be provided with a special credit key, such as key 19 in Figure 26, which is used to establish credit to the customers when they return merchandise previously purchased on credit. It will now be assumed that a customer returns a merchandise article for credit and that the amount of credit to be given the customer amounts to $6.95. The same procedure, as just described for a charge purchase, is taken by the sales person except in this case the credit key 19 is operated. That is, after inserting the credit slip in tray 18 the levers 24, 25, 26 and 27 are operated as previously described to set up the amount which is $6.95. The sales person then dials the customer's code number to operate the switch train to select this customer's register after which the credit key 19 is operated. The operation of credit key 19 completes a circuit for operating credit magnet, such as magnet 338, as follows: from ground thru the winding of magnet 338, terminals 694 and 684, conductor 674, bank contact 664, wiper 554, contacts 549, wipers 505, 495 and 475, contacts 455, wiper 435, contacts 425, credit conductor 405, credit key 19, conductor 406, and thru credit springs 20 closed by the operation of off-normal bar 39. Magnet 338 operates over this circuit to position rods 355 and 354 to move the adding ratchet stepping arms and stops to positions where they cannot operate the number wheels while the subtracting ratchet stepping arms are moved to operating positions where they are sequentially effective in response to the operations of step-over magnet 336 and drum 342 as previously described. In response to closing tray 18 the transmitter transmits step-over pulses to magnet 336 and operating pulses to magnet 337 to operate the number wheels of this customer's register to subtract the amount $6.95 from the accumulated total in the same manner as previously described. The number wheels are stepped in the reverse direction by the subtracting ratchet stepping arms as described in the mechanical description. The transmitter and switch train are restored in the same manner as previously described.

A credit position, such as shown enclosed in the dotted lines in Figure 27, may be provided in the credit office in order to permit a credit official to credit a customer's account, or if desired to also debit a customer's account. In order to establish connection with the desired customer's register, the credit man will operate hold key 487 to its locking position thereby operating start and hold relay 410' of line switch LS1 over an obvious circuit. Line switch LS1 is individual to this credit position and operates in the same manner as described for line switch LS to select an idle first selector, such as S1. In case test wiper 433' is standing on a grounded bank contact relay 420' is short-circuited and magnet 414' rotates the wipers 431' to 435' until wiper 433' engages a nongrounded bank contact. Switching relay 420' energizes when an idle selector is found and switches thru to such selector, for example selector S1. The credit man next operates the dial 17A in accordance with the customer's code number thereby operating selectors S1, S2 and S3 and connector C in the same manner as previously described. In this case the pulsing circuit for the first selector includes grounded contacts 443, wiper 432', contacts 422', pulsing contacts 484 of dial 17A, contacts 424', wiper 434', contacts 449, relay 450 and vertical magnet 453 to battery. The pulsing circuit for selectors S2 and S3 and connector C also include pulsing contacts 484. In case any of the selector switches encounter an all trunk busy condition the busy lamp 482 is operated over a circuit such as follows: from ground on the operated eleventh position selector cam springs, such as cam springs 457, over the selector conductors to wiper 431', contact 421', key 480 and thru busy lamp 482 to battery.

After connection with the customer's register the credit man operates the credit key 486 if he wants to credit the customer's account. In case the credit man wishes to debit the customer's account the credit key will not be operated. It will now be assumed that the credit man desires to credit the customer's account to the amount of $6.95 and therefore operates and locks credit key 486 to operate credit magnet, such as magnet 338, in the customer's register after which the credit man operates the step-over key 485 once to send a step-over pulse to step-over magnet 336. Credit magnet 338 is operated from ground thru the winding of magnet 338, terminals 684 and 684, conductor 674, bank contact 664, wipers 554, 505, 495, 475, contacts 455, wiper 435', contacts 425', and thru locked credit key 486 to battery. The circuit for operating step-over magnet 336 extends from ground at step-over key 485, contacts 424', wiper 434', contacts 448 and over the previously traced circuit to magnet 338 and battery. Magnet 338 conditions the ratchet stepping arms of the register so that only the subtracting ratchet stepping arms are effective. Magnet 336 operates the drum 342 to sequentially render successive stepping arms effective as previously described. The credit man next operates pulse dial 17B to transmit six ground pulses, corresponding to the "dollars" digit, to magnet 337 to operate the "dollars" number wheel to subtract six therefrom. After transmitting the "dollars" digit the credit man again momentarily operates step-over key 485 to operate step-over magnet to condition the "tens cents" subtracting ratchet stepping arms for operation. The credit man next dials the "tens cents" digit on dial 17B to transmit nine pulses to magnet 337 which operates the "tens cents" number wheel nine steps in the direction to subtract this amount. After transmitting the "tens cents" digit the credit man again momentarily operates the step-over key 485 to condition the "cents" subtracting ratchet stepping arms for operation. The credit man again operates dial 17B to transmit the "cents" digit five thereby operating magnet 337 five times to step the "cents" number wheel five steps in a direction to subtract this amount. The credit man again momentarily operates step-over key 485 to transmit a step-over pulse to magnet 338 to condition the "tens dollar" ratchet stepping arms for operation. The customer's register has now been operated to subtract the amount of $6.95 from its total. The credit man now restores the credit key 486 to release magnet 338 and restores the hold key 487 to cause the deenergization of relay 410' and the release of the switch train in a manner obvious from the foregoing description.

In case the credit man wants to debit the customer's account the operations are the same as just described except that the credit key 486 is not operated, magnet 338 is therefore not operated and the adding ratchet stepping arms of the customer's register are sequentially effective to step the number wheels to add the amount dialed by dial 17B to the customer's total. After dialling the credit man momentarily operates key 486 to see if the customer's credit limit has been exceeded. In case the customer's credit limit is not exceeded, lamp 481 is illuminated from the approval source of current at the closed credit limit contacts, such as 330. This circuit may be traced as follows: from ground thru lamp 481, front contacts of key 489, contacts 421', wiper 431', contacts 441, wipers 471, 491, 501 and 551, bank contact 661, conductor 671, terminals 681 and 693, and credit limit springs 330 to battery.

The switch train is restored to normal by releasing key 487 which releases relay 410' to remove the holding ground at contacts 411' to cause release of the switch train.

Certain customers have supervised charge accounts and when making a charge purchase must have each such purchase approved by some credit official and these customer's individual terminals, such as shown at 700 (Figure 29), are not equipped with any connections or equipment. Therefore, when such customer's individual terminals are connected with by the connectors, such as C, no approval source of current is provided to operate the OK magnet 142 in the transmitter. In all such cases the sales person refers such customers to the credit official who will personally approve or reject such purchases.

Other customers have unlimited charge accounts and the individual terminals of these customers have the approval source of current permanently connected to their individual terminals. For example, battery at 696 is connected to terminals 699, 685 and 686 and when the connector credit limit wiper 551 engages bank contacts, such as 675 and 676 this source of current operates the OK magnet 142 to print an approval indication on the sales check after transmission of the "cents" digit.

The second customer's register shown in Figure 29 has its operating spring 331' shown in operated position with the lip 332' on bracket 334' thereby opening credit limit contacts 330' to remove the approval source of current. Spring 331' could have been manually operated by some credit man to remove the credit for this customer or the customer may have made charge purchases exceeding his established limit. In either case since the approval source of current is removed each charge purchase thereafter made by this customer must be personally approved by some credit official.

In case a sales clerk is aware of an attempted fraudulent charge purchase she may automatically signal some store official by setting up the charge amount on the transmitter and then dialling her sales position code number instead of the dialling the customer's code number given her by the imposter. In this case the automatic switch train is operated to connect with the sales position terminals which terminates in bank contact 677 engaged by the pulse wiper, such as wiper 552, of the connector switches. As soon as the transmitter starts to send operating pulses, which ordinarily would operate the pulsing magnet, such as magnet 337, of a customer's register, the first of these ground pulses would be transmitted from the transmitter over the selector wipers and connector wiper 552 to bank contact 677, and thence by way of terminal 687 thru the winding of relay 690 to battery. Relay 690 operates in response to the first ground pulse and locks up over contacts 698 and key K. At contacts 699 relay 690 closes a circuit to sound the common alarm A located in some store official's office and at contacts 697 closes a circuit for illuminating lamp L which is individual to this particular sales position. Upon hearing the alarm and observing the lighted condition of lamp L the store official may proceed to this sales position to investigate the attempted fraud. The operation of key K will open the locking circuit of relay 690 which then restores to extinguish lamp L and stop the audible alarm A. The switch train is then released in the same manner as previously described.

Having described the invention, what is considered new and is desired to have protected by Letters Patent will be set forth in the following claims.

What is claimed is:

1. In an electrically operated authorizing system, a plurality of registers each having an assigned call number, a plurality of machines, levers in said machines manually operative from their normal positions to different positions in accordance with the amount of entry transactions, automatic switches, a calling device at each machine, means responsive to the manual operation of the levers at any calling one of said machines and the manual operation of the associated calling device in accordance with the call number of a desired register for directively operating a train of said automatic switches to connect said calling machine with the desired register, means at said calling machine for initiating the sequential release of said levers to their normal positions, means controlled by said levers during their return to normal for transmitting successive indications corresponding to said entry transactions to said connected register, means in said register for accumulating said transmitted indications, marking means in said calling machine controlled from said connected register for automatically marking an approval of the transmitted indications in case the accumulated indications transmitted to said register are less than a predetermined amount, and means in said register operative in case the accumulated indications exceed said predetermined amount to prevent the operation of said approval marking means in said calling machine.

2. In an electrically operated authorizing system, a plurality of machines, a plurality of registers, limit means in each of said registers manually settable to different positions corresponding to varying amounts, means controlled from any one of said machines for electrically selecting and connecting any one of said registers with said one machine, manual means for posting the amount of transaction entries on said one machine, means for transmitting digits corresponding to the amount of said posted transaction entries from said one machine to said connected register, means in said connected register operated in response to said transmitted digits corresponding to the amount of said posted entries for advancing its limit means in accordance with the value of said transmitted digits, circuit controlling means at each of said registers having an approval position and a reject position, means responsive to the advance of said limit means in said connected register from its manually set position to a predetermined point for operating the circuit controlling means in said connected register from its approval position to its reject position, and recording means in said one machine for printing an approval of the amount of said entry transaction only in case said circuit controlling means in said connected register is still in its approval position.

3. In a credit authorizing system, a plurality of first sets of terminals, a plurality of second sets of terminals, a plurality of third sets of terminals, means for marking certain ones of said terminals, one terminal of each of said first sets being marked for permanent approval, one terminal of each of said second sets being marked for temporary approval and there being an absence of said markings on said third sets of terminals; a plurality of transmitting stations, means controlled from any one of said stations for selecting and connecting with any set of terminals and for transmitting transaction entries thereto from said one station, individual registering means associated with each of said second sets of terminals for accumulatingly registering the sum total of the entries transmitted thereto, means including a portion of said first means associated with each individual registering means for removing said temporary approval marking from its corresponding marked terminal in response to the accumulated total registered therein exceeding a predetermined amount, and recording means at each of said transmitting stations automatically operated by the connection of said approval markings for printing approvals of such entries, said recording means being inoperative in case there is an absence of approval markings on the connected terminal set.

4. In a merchandise control system, a plurality of registers, a plurality of transmitters, means controlled from any one of said transmitters for automatically selecting and completing a connection to a particular desired one of said registers, means in said selected register controlled from said one transmitter connected thereto over said connection for conditioning said selected register to make debit registrations in case of a purchase and credit registrations in case of a refund, means for transmitting indications from said connected transmitter to said selected register; means in said selected register operated in response to said transmitted indications for adding said transmitted indications to previously registered indications in case said selected register is conditioned for a debiting operation and operated in response to said transmitted indications for subtracting said transmitted indications from previously registered indications in case said register is conditioned for a crediting operation; and recording means individual to said connected transmitter operated after transmission of said indications over said connection for recording an approval of said transmitted indications.

5. In an authorizing system, a register for registering transactions, means for effecting entries into said register to register each entry transaction, recording means operated in response to each entry transaction into said register for making recordings indicating approval of each entry transaction, and an approval electrical circuit in said register opened in response to said register reaching a predetermined value to prevent the operation of said recording means to thereby prevent the making of said approval recordings.

6. In an authorizing system, a register for registering transactions, means for effecting entries into said register to register each entry transaction, control contacts on said register, recording means controlled by said contacts in response to each entry transaction into said register for making recordings indicating approval of each entry transaction, and means in said register for operating said contacts in response to said register reaching a predetermined value to prevent the operation of said recording means to thereby prevent the making of approval recordings.

7. In an authorizing system, a register for registering transactions, a plurality of transmitting mechanisms for transmitting entry transactions, means for effecting entries into said register of transmitted entry transactions from any of said transmitting mechanisms to register each entry transaction, recording means individual to each transmitting mechanism for making an approval recording for each entry transaction transmitted therefrom, and means in said register operated in response to said register reaching a predetermined value to prevent the operation of said recording means to thereby prevent the making of approval recordings.

8. In an authorizing system, a plurality of registers, control means associated with each register manually settable at a predetermined amount, transmitting means for effecting entries into any of said registers to operate said registers to accumulatively register the amounts of each entry transaction and to accumulatively operate the corresponding control means corresponding amounts, recording means associated with each transmitting means operative in response to each entry transmitted therefrom into said registers for recording an approval of each entry transaction, and means in said registers operated by said control means in response to said control means reaching or exceeding said predetermined amount for preventing the operation of said recording means to thereby prevent the making of approval recordings.

9. In an authorizing system, a plurality of sending stations, a plurality of registers, means controlled from any one of said stations for selecting and connecting with any desired one of said registers, means for transmitting numerical data from said connected station over said established connection to said connected register, means in said connected register for registering said data in response to said transmission, limiting means in said register normally effective until the data registered in said connected register exceeds a predetermined amount, recording means at the connected station controlled over said established connection by said limiting means at said connected register for making approval recordings of the transmitted data, and means for making said limiting means ineffective to control said recording means in response to the registered data on said register reaching or exceeding said predetermined amount to thereby prevent the making of the approval recordings.

10. In an electrically operated authorizing system, a plurality of registers each having an individual call number, a plurality of transmitting machines, a train of automatic switches, means at any calling one of said machines for directively operating said switches in accordance with the call number of a desired register to directively select and connect said desired register to the calling machine, means for automatically transmitting transaction entries from said calling machine to said connected register, means in said connected register operative in response to said transmitted entries for accumulatively registering the amounts of such entries, a normally closed authorizing circuit in said connected register, means for opening said circuit in case said connected register's registrations reach or exceed a predetermined amount, and recording means in said calling machine controlled over said established connection and said authorizing circuit for recording approval of the said transmitted entries only in case said authorizing circuit is closed.

11. In an authorizing system, a plurality of transmitting stations, a first set of terminals, a second set of terminals, means operative from any calling one of said stations for directively completing a connection between said calling station and any desired set of said terminals, means for transmitting entry transactions over said established connection from said calling station to said connected set of terminals, a register connected to said second set of terminals operated in response to the transaction entries transmitted thereto over said established connection to accumulatively register the amounts of such transmitted entries, a source of approval current permanently connected to a terminal of said first set, normally closed contacts connecting said source to a terminal of said second set, means associated with said register for opening said normally closed contacts in response to said register being operated to register a predetermined amount or more to disconnect said source from said terminal of said second set, and recording means at said calling station controlled over said established connection by the presence of said source at the connected terminal set after transmission of said entries for printing an approval recording of each transmitted entry transaction, and said recording means being ineffective to print an approval recording by the absence of said source from said connected terminal set.

CLARENCE MARBLE.

REFERENCES CITED

The following references are of record in the file of this patent:

UNITED STATES PATENTS

| Number | Name | Date |
|---|---|---|
| 1,084,667 | Tallmadge | Jan. 20, 1914 |
| 1,186,469 | Crumpton | June 6, 1916 |
| 1,585,480 | Fletcher | May 18, 1926 |
| 1,809,157 | Brand | June 9, 1931 |
| 2,049,499 | Haselton | Aug. 4, 1936 |
| 2,066,698 | Simpson | Jan. 5, 1937 |
| 2,272,242 | Frischknecht | Feb. 10, 1942 |
| 2,311,455 | Muehter | Feb. 16, 1943 |
| 2,325,744 | Cooper | Aug. 3, 1943 |
| 2,340,809 | Hatton et al. | Feb. 1, 1944 |
| 2,364,769 | Anderson | Dec. 12, 1944 |
| 2,432,324 | May | Dec. 9, 1947 |